(12) United States Patent
Teran Guajardo et al.

(10) Patent No.: US 11,438,163 B2
(45) Date of Patent: Sep. 6, 2022

(54) CLOUD-BASED MANAGEMENT SERVICE DEVICE REGISTRATION USING INTERMEDIATE CLOUD STORAGE

(71) Applicant: Microsoft Technology Licensing, LLC, Redmond, WA (US)

(72) Inventors: Adrian Francisco Teran Guajardo, Redmond, WA (US); Hung Minh Dang, Seattle, WA (US); Yanan Zhang, Bellevue, WA (US); Brian Stuart Perlman, Bothell, WA (US); Colin William Hassett, Madison, WI (US); Jonathan M. Andes, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 150 days.

(21) Appl. No.: 16/917,722

(22) Filed: Jun. 30, 2020

(65) Prior Publication Data
US 2021/0377033 A1  Dec. 2, 2021

Related U.S. Application Data

(60) Provisional application No. 63/031,553, filed on May 28, 2020.

(51) Int. Cl.
*H04L 9/32* (2006.01)
*H04L 29/06* (2006.01)
(Continued)

(52) U.S. Cl.
CPC .......... *H04L 9/3234* (2013.01); *G06K 7/1417* (2013.01); *H04L 9/3236* (2013.01); *H04L 63/0876* (2013.01); *H04L 67/10* (2013.01)

(58) Field of Classification Search
CPC . H04L 9/3234; H04L 9/3236; H04L 63/0876; H04L 67/10; H04L 63/061;
(Continued)

(56) References Cited

U.S. PATENT DOCUMENTS 10,402,814 B2 * 9/2019 Wong ................... G06Q 20/327
10,547,613 B1 * 1/2020 Roths ................... H04L 9/0844
(Continued)

FOREIGN PATENT DOCUMENTS

WO         2017139652 A1     8/2017

OTHER PUBLICATIONS

"A New Technique to Use QR Codes in Cryptography"—Somdip Dey, Dept. of Computer Science, St. Xavier's College, Apr. 2012 https://arxiv.org/ftp/arxiv/papers/1205/1205.4829.pdf (Year: 2012).*
"A Study on QR Code Based Public Cloud Data Protection"—Srikanth Bharadwaj, Department of Computer Science, Bangalore Institute of Technology, Visvesvaraya Technological University, IJCSE vol. 8, Jul. 2017 http://www.ijcse.com/docs/INDJCSE17-08-03-123.pdf (Year: 2017).*
(Continued)

*Primary Examiner* — Randy A Scott
(74) *Attorney, Agent, or Firm* — Wade IP Law PLLC

(57) ABSTRACT

Techniques are described herein that are capable of registering a user device with a cloud-based management service using an intermediate cloud storage. For instance, the intermediate cloud storage may store an encrypted data blob including information that identifies the user device. The intermediate cloud storage or a registration system may decrypt the encrypted data blob so that the registration system may use the decrypted data blob to register the user device with the cloud-based management service. For instance, the registration system may retrieve the encrypted or decrypted data blob from the intermediate cloud storage by providing a requisite secret to the intermediate cloud storage. The requisite secret may be provided to the registration system by the user device (e.g., via a matrix barcode, such as a QR code).

20 Claims, 12 Drawing Sheets

(51) Int. Cl.
*G06K 7/14* (2006.01)
*H04L 29/08* (2006.01)
*H04L 9/40* (2022.01)
*H04L 67/10* (2022.01)

(58) Field of Classification Search
CPC ............. H04L 12/069; H04L 63/0428; H04W 12/009; H04W 12/50; G06K 7/1417
See application file for complete search history.

(56) References Cited

U.S. PATENT DOCUMENTS

| | | | | |
|---|---|---|---|---|
| 2014/0122884 | A1* | 5/2014 | Pieczul | H04W 12/06 713/171 |
| 2017/0244676 | A1* | 8/2017 | Edwards | H04L 63/08 |
| 2018/0109418 | A1* | 4/2018 | Cammarota | H04L 9/0827 |

OTHER PUBLICATIONS

Niehaus, et al., "Windows Autopilot Companion", Retrieved from: https://github.com/microsoft/WindowsAutopilotCompanion, Dec. 4, 2019, 3 Pages.

Satran, et al., "Encrypting Data with CNG", Retrieved from: https://docs.microsoft.com/en-us/windows/desktop/SecCNG/encrypting-data-with-cng, May 31, 2018, 11 Pages.

Thake, et al., "importedWindowsAutopilotDeviceIdentity resource type", Retrieved from: https://docs.microsoft.com/en-us/graph/api/resources/intune-enrollment-importedwindowsautopilotdeviceidentity?view=graph-rest-1.0, Apr. 14, 2020, 3 Pages.

"International Search Report and Written Opinion Issued in PCT Application No. PCT/US21/023792", dated Jun. 9, 2021, 13 Pages.

\* cited by examiner

CLOUD-BASED MANAGEMENT SERVICE DEVICE REGISTRATION USING INTERMEDIATE CLOUD STORAGE

CROSS-REFERENCE TO RELATED APPLICATION(S)

This application claims the benefit of U.S. Provisional Application No. 63/031,553, filed May 28, 2020 and entitled "Cloud-Based Management Service Device Registration Using Intermediate Cloud Storage," the entirety of which is incorporated herein by reference.

BACKGROUND

A cloud-based management service enables management of computing devices using a network of servers that is referred to as "the cloud." An information technology (IT) administrator often uses a cloud-based management service to manage computing devices that are used by employees of a company to access resources of the company. To enable the computing devices to be managed using the cloud-based management service, the IT administrator registers the computing devices with a tenant of the cloud-based management service. A tenant of a cloud-based management service is an entity (e.g., customer) whose data is isolated from and remains unknown to other tenants of the cloud-based management service. The IT administrator typically registers the computing devices with the tenant of the cloud-based management service before providing the computing devices to the users. Thus, the aforementioned registration of the computing devices is commonly referred to as "pre-registration."

The IT administrator typically uses a data blob located on each computing device to register the respective computing device with the tenant of the cloud-based management service. For example, the IT administrator may plug a removable memory device (e.g., a thumb drive) into each computing device, run a script that collects the respective data blob, log into a portal of the cloud-based management service, and upload the respective data blob from the removable memory device to the cloud-based management service.

It may be desirable to extract the data blob from each computing device by reading a matrix barcode, such as a quick response (QR) code. However, an amount of information that can be read from a matrix barcode may be limited by capabilities of the reader that is used to extract the data blob. An increase in the amount of data stored in a data blob corresponds to an increase in the resolution of the QR code that represents the data blob. Noise associated with the QR code may result in a failure to replicate the data blob that is represented by the matrix barcode.

SUMMARY

Various approaches are described herein for, among other things, registering a user device with a cloud-based management service (a.k.a. cloud-based management system) using an intermediate cloud storage. For instance, the intermediate cloud storage may store an encrypted data blob including information that identifies the user device. The intermediate cloud storage or a registration system may decrypt the encrypted data blob so that the registration system may use the decrypted data blob to register the user device with the cloud-based management service. For instance, the registration system may retrieve the encrypted or decrypted data blob from the intermediate cloud storage by providing a requisite secret to the intermediate cloud storage. The requisite secret may be provided to the registration system by the user device (e.g., via a matrix barcode, such as a QR code).

In a first example approach, a matrix barcode that identifies a user device is scanned. The matrix barcode includes a session identifier, a decryption key, and a correlation key. The session identifier identifies a session during which the user device is registered with a cloud-based management service. The decryption key is configured to be used to decrypt an encrypted data blob that is to be received from the user device. The correlation key is useable to correlate the user device to actions and/or records that are associated with the user device. An intermediate cloud storage is triggered to decrypt the encrypted data blob, which includes information that identifies the user device, using the decryption key to provide a decrypted data blob by providing the session identifier, the decryption key, and the correlation key to the intermediate cloud storage. The decrypted data blob is received from the intermediate cloud storage. The user device is registered with the cloud-based management service using the decrypted data blob.

In a second example approach, a matrix barcode that identifies a user device is scanned. The matrix barcode includes a session identifier, a decryption key, and a correlation key. The session identifier identifies a session during which the user device is registered with a cloud-based management service. The decryption key is configured to be used to decrypt an encrypted data blob that is to be received from the user device. The correlation key is useable to correlate the user device to actions and/or records that are associated with the user device. The encrypted data blob, which includes information identifying the user device, is retrieved from an intermediate cloud storage, which receives the encrypted data blob from the user device. The encrypted data blob, which is retrieved from the intermediate cloud storage, is decrypted using the decryption key that is included in the matrix barcode to provide a decrypted data blob. The user device is registered with the cloud-based management service using the decrypted data blob.

The approaches described herein may be applied with respect to any suitable number (e.g., 5, 20, hundreds, or thousands) of user devices to register the user devices with a cloud-based management service.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Moreover, it is noted that the invention is not limited to the specific embodiments described in the Detailed Description and/or other sections of this document. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form part of the specification, illustrate embodiments of the present invention and, together with the description, further serve to explain the principles involved and to enable a person skilled in the relevant art(s) to make and use the disclosed technologies.

Figure 1:
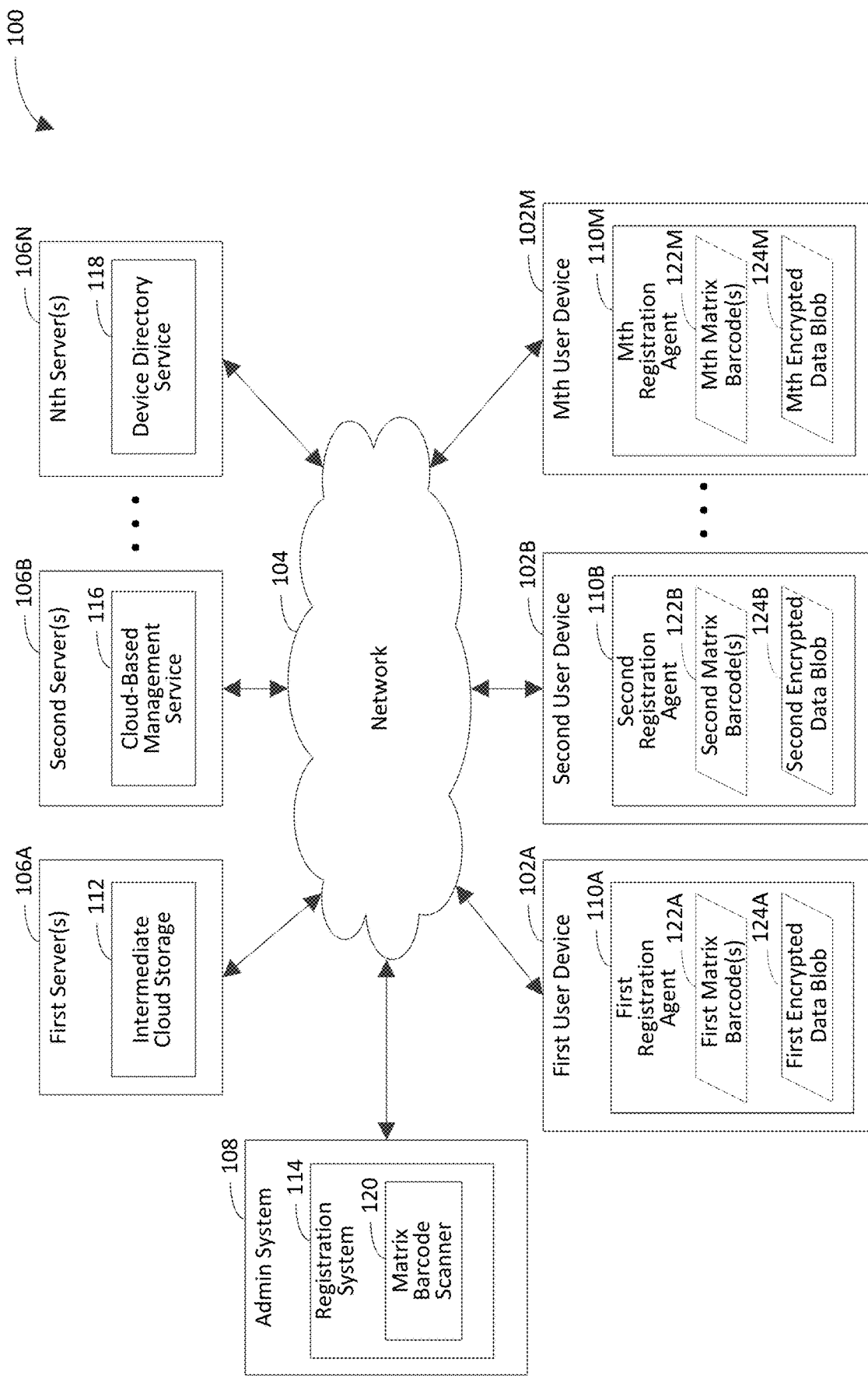
FIG. 1 is a block diagram of an example intermediate cloud storage-based device registration system in accordance with an embodiment.

The features and advantages of the disclosed technologies will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The following detailed description refers to the accompanying drawings that illustrate exemplary embodiments of the present invention. However, the scope of the present invention is not limited to these embodiments, but is instead defined by the appended claims. Thus, embodiments beyond those shown in the accompanying drawings, such as modified versions of the illustrated embodiments, may nevertheless be encompassed by the present invention.

References in the specification to "one embodiment," "an embodiment," "an example embodiment," or the like, indicate that the embodiment described may include a particular feature, structure, or characteristic, but every embodiment may not necessarily include the particular feature, structure, or characteristic. Moreover, such phrases are not necessarily referring to the same embodiment. Furthermore, when a particular feature, structure, or characteristic is described in connection with an embodiment, it is submitted that it is within the knowledge of one skilled in the relevant art(s) to implement such feature, structure, or characteristic in connection with other embodiments whether or not explicitly described.

Descriptors such as "first", "second", "third", etc. are used to reference some elements discussed herein. Such descriptors are used to facilitate the discussion of the example embodiments and do not indicate a required order of the referenced elements, unless an affirmative statement is made herein that such an order is required.

II. Example Embodiments

Example embodiments described herein are capable of registering a user device with a cloud-based management service (a.k.a. cloud-based management system) using an intermediate cloud storage. For instance, the intermediate cloud storage may store an encrypted data blob including information that identifies the user device. The intermediate cloud storage or a registration system may decrypt the encrypted data blob so that the registration system may use the decrypted data blob to register the user device with the cloud-based management service. For instance, the registration system may retrieve the encrypted or decrypted data blob from the intermediate cloud storage by providing a requisite secret to the intermediate cloud storage. The requisite secret may be provided to the registration system by the user device (e.g., via a matrix barcode, such as a QR code). The example techniques described herein may be applied with respect to any suitable number (e.g., 5, 20, hundreds, or thousands) of user devices to register the user devices with a common (e.g., same) cloud-based management service.

Example techniques described herein have a variety of benefits as compared to conventional techniques for registering user device(s) with a cloud-based management service. For instance, the example techniques may be capable of increasing a likelihood that registration of the user device(s) with the cloud-based management service will succeed. The example techniques may simplify a process for registering the user device(s) and/or speed up the process in a secure way. The example techniques may be at least as secure as manual techniques for registering user device(s) with a cloud-based management service.

The example techniques may enable each user device to upload an encrypted data blob, which includes information that identifies the user device, to a non-authenticated intermediate cloud storage, which may make the encrypted data blob (or a decrypted version thereof) available to a caller that provides an expected session identifier and an expected correlation key. The example techniques may be capable of pre-authorizing an upload of each encrypted data blob from the respective user device to the intermediate cloud storage so that the caller may authenticate with a session identifier and/or a correlation key. For instance, the intermediate cloud storage may have been previously informed (e.g., by the registration system) to expect a call that includes the session identifier and the correlation key.

The example techniques may decrease latency associated with registering a user device with a cloud-based management service and/or increase reliability of the device registration process. The example techniques may automate at least some of the manual operations that are characteristic of conventional techniques for registering a user device with a cloud-based management service.

The example techniques may reduce an amount of time and/or resources (e.g., processor cycles, memory, network bandwidth) that is consumed to register a user device with a cloud-based management service. The example techniques may reduce a cost associated with registering a user device with a cloud-based management service. For instance, by utilizing an intermediate cloud storage, the example techniques may reduce complexity of the device registration process and/or reduce interactions of the IT administrator (and delay associated with such interactions), which may reduce a cost of registering the user device with the cloud-based management service. Reducing complexity of device registration and/or a number of IT administrator interactions may reduce the time and/or resource consumption associated with registering the user device with the cloud-based management service. The example techniques may increase efficiency of a computing system that is used to register a user device with a cloud-based management service.

The example techniques may increase efficiency of an IT administrator. For example, by utilizing an intermediate cloud storage, the example techniques may reduce a number of steps that are performed by the IT administrator, an amount of effort that the IT administrator expends, and/or an amount of time that the IT administrator takes to facilitate registration of a user device with a cloud-based management service. The example techniques may improve a user experience of the IT administrator (e.g., by automating or streamlining the device registration process).

FIG. 1 is a block diagram of an example intermediate cloud storage-based device registration system 100 in accordance with an embodiment. Generally speaking, the intermediate cloud storage-based device registration system 100 operates to provide information to users in response to (e.g., based on) requests (e.g., hypertext transfer protocol (HTTP) requests) that are received from the users. The information may include documents (e.g., Web pages, images, audio files, video files, etc.), output of executables, and/or any other suitable type of information. In accordance with example embodiments described herein, the intermediate cloud storage-based device registration system 100 registers a plurality of user devices 102A-102M with a cloud-based management service 116.

As shown in FIG. 1, the intermediate cloud storage-based device registration system 100 includes the plurality of user devices 102A-102M, a network 104, a plurality of servers 106A-106N, and an admin system 108. Communication among the user devices 102A-102M, the servers 106A-106N, and the admin system 108 is carried out over the network 104 using well-known network communication protocols. The network 104 may be a wide-area network (e.g., the Internet), a local area network (LAN), another type of network, or a combination thereof.

The user devices 102A-102M are processing systems that are capable of communicating with the servers 106A-106N and the admin system 108. An example of a processing system is a system that includes at least one processor that is capable of manipulating data in accordance with a set of instructions. For instance, a processing system may be a computer, a personal digital assistant, etc. The user devices 102A-102M are configured to provide requests to the servers 106A-106N for requesting information stored on (or otherwise accessible via) the servers 106A-106N. For instance, a user may initiate a request for executing a computer program (e.g., an application) using a client (e.g., a Web browser, Web crawler, or other type of client) deployed on a user device 102 that is owned by or otherwise accessible to the user. In accordance with some example embodiments, the user devices 102A-102M are capable of accessing domains (e.g., Web sites) hosted by the servers 106A-106N, so that the user devices 102A-102M may access information that is available via the domains. Such domains may include Web pages, which may be provided as hypertext markup language (HTML) documents and objects (e.g., files) that are linked therein, for example.

Each of the user devices 102A-102M may include any client-enabled system or device, including but not limited to a desktop computer, a laptop computer, a tablet computer, a wearable computer such as a smart watch or a head-mounted computer, a personal digital assistant, a cellular telephone, an Internet of things (IoT) device, or the like. It will be recognized that any one or more of the user devices 102A-102M may communicate with any one or more of the servers 106A-106N.

The user devices 102A-102M are shown to include respective registration agents 110A-110M. The registration agents 110A-110M are configured to provide respective matrix barcodes 122A-122M and respective encrypted data blobs 124A-124M to facilitate registration of the user devices 102A-102M with the cloud-based management service 116. The matrix barcodes 122A-122M include respective session identifiers, respective decryption keys, and respective correlation keys. Each session identifier identifies a session during which the respective user device is registered with the cloud-based management service 116. For example, the session identifier may be a random number or string of characters. In another example, the session identifier may be a semi-random number or string of characters. Each decryption key is configured to be used to decrypt the respective encrypted data blob that is provided by the respective user device. Each correlation key is useable to correlate the respective user device to actions and/or records that are associated with the respective user device. For instance, each correlation key may be used to track, audit, and/or troubleshoot the respective user device and/or to generate a report regarding the respective user device. Each correlation key may include a product key associated with the respective user device. Each product key may identify an operating system (OS) license of an OS that is utilized by (e.g., deployed on) the respective user device. For example, the product key associated with each user device may serve as a convenient correlator because the product key may be available in a purchase order associated with the user device, may be included in references to the user device by an original equipment manufacturer (OEM) that manufactured the user device, may be used in support tickets regarding the user device, and/or may be embedded in the user device (e.g., copied into a motherboard thereof) so that the product key is available to the OS of the user device. Each decryption key and/or each correlation key may be a symmetric key or an asymmetric public key. For example, each decryption key and/or each correlation key may be a cryptographic key that is generated in accordance with the Advanced Encryption Standard (AES), which was established by the U.S. National Institute of Standards and Technology (NIST) in 2001. In accordance with this example, each decryption key and/or each correlation key may be an AES-128, AES-192, or AES-256 key. Each encrypted data blob includes information that identifies the user device that provides the respective encrypted data blob.

The servers 106A-106N are processing systems that are capable of communicating with the user devices 102A-102M. The servers 106A-106N are configured to execute computer programs that provide information to the user devices 102A-102M. For instance, the servers 106A-106N may push such information to the user devices 102A-102M or provide the information in response to requests that are received from the user devices 102A-102M. The requests may be user-generated or generated without user involvement. The information provided by the servers 106A-106N may include documents (e.g., Web pages, images, audio files, video files, etc.), output of executables, or any other suitable type of information. In accordance with some example embodiments, the servers 106A-106N are configured to host respective Web sites, so that the Web sites are accessible to users of the intermediate cloud storage-based device registration system 100.

First server(s) 106A is shown to include intermediate cloud storage 112 for illustrative purposes. The intermediate cloud storage 112 is configured to receive the encrypted data blobs 124A-124M from the respective registration agents 110A-110M. In one example implementation, the intermediate cloud storage 112 is configured to provide access to the encrypted data blobs 124A-124M in response to receipt of respective designated secrets from entities that request access to the encrypted data blobs 124A-124M. For instance, intermediate cloud storage 112 may provide access to the first encrypted data blob 124A in response to receipt of a respective first designated secret. The intermediate cloud storage 112 may provide access to the second encrypted data blob 124B in response to receipt of a respective second designated secret, and so on. Each secret may include the session identifier and the correlation key that is included in the matrix barcode provided by the user device that provided the respective matrix barcode. In another example implementation, the intermediate cloud storage 112 is configured to decrypt the encrypted data blobs 124A-124M to provide respective decrypted data blobs. In accordance with this implementation, the intermediate cloud storage 112 is configured to provide access to the decrypted data blobs in response to receipt of respective designated secrets from entities that request access to the decrypted data blobs.

Second server(s) 106B is shown to include cloud-based management service 116 for illustrative purposes. The cloud-based management service 116 is configured to enable management of the user devices 102A-102M. For instance, the cloud-based management service 116 may enable an IT administrator associated with the admin system 108 to manage the user devices 102A-102M. To this end, the cloud-based management service 116 provides a deployment platform profile identifier to each of the user devices 102A-102M in response to receipt of a designated secret and the decrypted data blob that identifies the respective user device. The designated secret for each user device may include the session identifier associated with the respective user device. The cloud-based management service 116 may receive the designated secrets and the decrypted data blobs from the admin system 108. Each deployment platform profile identifier specifies settings and policies that are to be applied to the respective user device for purposes of configuring the respective user device.

The cloud-based management service 116 is configured to obtain the deployment platform profile identifiers from a device directory service (DDS) 118. For instance, the cloud-based management service 116 may provide the decrypted data blob of each of the user devices 102A-102M to the DDS 118 in response to receipt of the respective designated secret and the respective decrypted data blob. The cloud-based management service 116 may receive each deployment platform profile identifier from the DDS 118 based on the cloud-based management service 116 providing the decrypted data blob of the user device to which the respective deployment platform profile identifier is to be provided.

Nth server(s) 106N is shown to include the DDS 118 for illustrative purposes. The DDS 118 is configured to provide the deployment platform profile identifier for each user device to the cloud-based management service 116 in response to receipt of the decrypted data blob of the respective user device from the cloud-based management service 116. For example, the DDS 118 may maintain a cross-reference list that cross-references the decrypted data blobs of the user devices 102A-102M with the deployment platform profile identifiers of the user devices 102A-102M. Upon receipt of the decrypted data blob of a user device, the DDS 118 may traverse the cross-reference list to determine which of the deployment platform profile identifiers is cross-referenced with the decrypted data blob of the user device. The DDS 118 may provide the deployment platform profile identifier that is cross-referenced with the decrypted data blob of the user device to the cloud-based management service 116 for forwarding to the user device.

The admin system 108 is a processing system that is capable of communicating with the user devices 102A-102M and the servers 106A-106N. The admin system 108 is configured to perform operations to facilitate registration of the user devices 102A-102M with the cloud-based management service 116 (e.g., in response to instructions that are received from the IT administrator associated with the IT admin system 108). The admin system 108 includes a registration system 114, which is configured to communicate with the registration agents 110A-110M of the respective user devices 102A-102M, the intermediate cloud storage 112, and the cloud-based management service 116 to facilitate registration of the user devices 102A-102M with the cloud-based management service 116. The registration system 108 is configured to scan the matrix barcodes 122A-122M, which are received from the respective registration agents 110A-110M. For example, the registration system 114 includes a matrix barcode scanner 120, which is configured to scan the matrix barcodes 122A-122M. The matrix barcode scanner 120 may scan the matrix barcodes 122A-122M using pairing between the matrix barcode scanner 120 and the respective user devices 102A-102M. For instance, the pairing may be achieved using a wireless technology standard, such as Bluetooth® or ZigBee®. In accordance with this example, the registration system 114 may analyze the matrix barcodes 122A-122M that are scanned by the matric barcode scanner to identify the respective session identifiers, the respective decryption keys, and the respective correlation keys therein.

In a first example implementation, the registration system 114 receives the encrypted data blobs 124A-124M from the respective registration agents 110A-110M. In accordance with this implementation, the registration system 114 triggers the intermediate cloud storage 112 to decrypt the encrypted data blobs 124A-124M using the respective decryption keys to provide respective decrypted data blobs. For instance, the registration system 114 may trigger the intermediate cloud storage 112 to decrypt each encrypted data blob by providing the respective session identifier, the respective decryption key, and the respective correlation key to the intermediate cloud storage 112. In further accordance with this implementation, the registration system 114 receives the decrypted data blobs from the intermediate cloud storage 112.

In a second example implementation, the registration system 114 retrieves the encrypted data blobs 124A-124M from the intermediate cloud storage 112 (e.g., in response to the intermediate cloud storage 112 receiving the encrypted data blobs 124A-124M from the respective registration agents 110A-110M). In accordance with this implementation, the registration system 114 decrypts the encrypted data blobs 124A-124M using the respective decryption keys that are included in the respective matrix barcodes 122A-122M to provide respective decrypted data blobs.

In both of these implementations, the registration system 114 registers the user devices 102A-102M with the cloud-based management service 116 using the respective decrypted data blobs.

Each of the registration agents 110A-110M, the intermediate cloud storage 112, the registration system 114, the cloud-based management service 116, and the DDS 118 may be implemented in various ways to facilitate registration of any one or more of the user devices 102A-102M with the cloud-based management service 116, including being implemented in hardware, software, firmware, or any combination thereof. For example, each of the registration agents 110A-110M, the intermediate cloud storage 112, the registration system 114, the cloud-based management service 116, and the DDS 118 may be implemented as computer program code configured to be executed in one or more processors. In another example, each of the registration agents 110A-110M, the intermediate cloud storage 112, the registration system 114, the cloud-based management service 116, and the DDS 118 may be at least partially implemented as hardware logic/electrical circuitry. For instance, each of the registration agents 110A-110M, the intermediate cloud storage 112, the registration system 114, the cloud-based management service 116, and the DDS 118 may be at least partially implemented in a field-programmable gate array (FPGA), an application-specific integrated circuit (ASIC), an application-specific standard product (ASSP), a system-on-a-chip system (SoC), a complex programmable logic device (CPLD), etc. Each SoC may include an integrated circuit chip that includes one or more of a processor (e.g., a microcontroller, microprocessor, digital signal processor (DSP), etc.), memory, one or more communication interfaces, and/or further circuits and/or embedded firmware to perform its functions.

The intermediate cloud storage 112, the cloud-based management service 116, and the DDS 118 are shown to be incorporated in separate servers or groups thereof for illustrative purposes and are not intended to be limiting. It will be recognized that each of the intermediate cloud storage 112, the cloud-based management service 116, and the DDS 118 may be incorporated in any one or more of the servers 106A-106N. For instance, any two or more of the intermediate cloud storage 112, the cloud-based management service 116, and/or the DDS 118 may be incorporated partially or entirely in a common (e.g., same) server.

Figure 2:
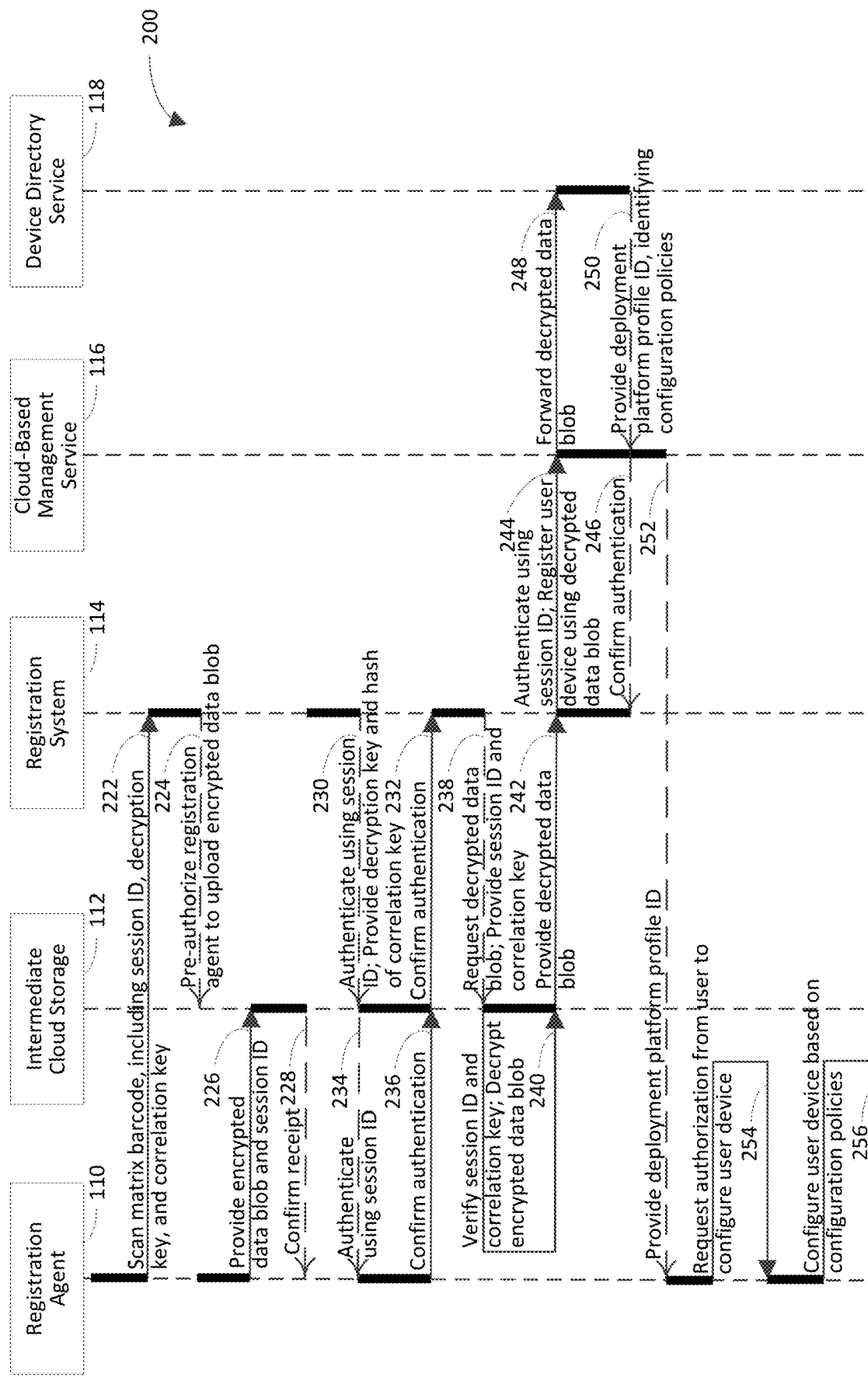
FIGS. 2-3 are example activity diagrams for registering a user device with a cloud-based management service using an intermediate cloud storage in accordance with embodiments.

FIG. 2 is an example activity diagram 200 for registering a user device with a cloud-based management service using an intermediate cloud storage in accordance with an embodiment. FIG. 2 depicts the registration agent 110, the intermediate cloud storage 112, the registration system 114, the cloud-based management service 116, and the device directory service (DDS) 118 shown in FIG. 1. Activities 222, 224, 226, 228, 230, 232, 234, 236, 238, 240, 242, 244, 246, 248, 250, 252, 254. and 256 will now be described with reference to the registration agent 110, the intermediate cloud storage 112, the registration system 114, the cloud-based management service 116, and the DDS 118.

In activity 222, the registration system 114 scans a matrix barcode (e.g., a QR code). The matrix barcode includes a session identifier (a.k.a. session ID), a decryption key, and a correlation key. The session ID identifies a session in which the user device is registered with the cloud-based management service 116. The decryption key is configured to be used to decrypt an encrypted data blob that is to be received from the user device. The decryption key may be a symmetric key or an asymmetric public key. The correlation key is configured to be used to correlate the user device to a record that are associated with the user device. Activity 226 may include analyzing the matrix barcode, for example, to identify the session ID, the decryption key, and the correlation key.

In an example embodiment, the registration system 114 displays a message on a display of an admin system that includes the registration system 114. The message prompts a user of the admin system (e.g., the IT administrator who is using the registration system 114 to pre-provision the user device with the cloud-based management service 116) to initiate scanning of the matrix barcode. For instance, the user may initiate scanning of the matrix barcode by directing a matrix barcode scanner toward the display of the user device on which the registration agent 110 is deployed and providing a user input that causes the matrix barcode scanner to scan the matrix barcode from the display of the user device.

In activity 224, the registration system 114 pre-authorizes the registration agent 110 (e.g., the user device, which includes the registration agent 110) to upload the encrypted data blob to the intermediate cloud storage 112. Pre-authorizing the registration agent 110 to upload the encrypted data blob means that the registration agent 110 is authorized to upload the encrypted data blob before the registration agent 110 uploads the encrypted data blob. The registration system 114 may pre-authorize the registration agent 110 based at least in part on the matrix barcode (e.g., the correlation key therein) authenticating the registration agent 110 to the registration system 114. The registration system 114 may indicate that the user device is pre-authorized to upload the encrypted data blob to the intermediate cloud storage 112 by providing a shared secret (e.g., the session ID) that is associated with the user device to the intermediate cloud storage 112. For instance, the intermediate cloud storage 112 may be configured to ignore (and therefore not store) each data blob (whether encrypted or not) unless the user device that provides the data blob has been pre-authorized by the registration system 114. By pre-authorizing user devices in this manner, the intermediate cloud storage 112 may be spared from being subjected to a large-scale attack in which malicious software applications could bombard the intermediate cloud storage 112 with data blobs, each of which may include 4 kilobytes (kB) or more of data, until the performance of the intermediate cloud storage 112 becomes substantially compromised.

In activity 226, the registration agent 110 provides the encrypted data blob and the session ID to the intermediate cloud storage 112. For instance, the registration agent 110 may provide the encrypted data blob and the session ID using a POST command. The encrypted data blob serves as an identifier to identify the user device. For instance, the encrypted data blob may uniquely identify the user device. The registration agent 110 may authenticate the intermediate cloud storage 112 before providing the encrypted data blob and the session ID to the intermediate cloud storage 112.

In an example embodiment, the registration agent 110 displays a webpage associated with a device pre-provisioning service of the cloud-based management service 116 on a display of a user device on which the registration agent 110 is deployed. The webpage prompts a user of the user device (e.g., an IT administrator who is using the registration system 114 to pre-provision the user device with the cloud-based management service 116) to provide a designated input via a user interface (e.g., display, keyboard, or mouse) of the user device to proceed with registering the user device with the cloud-based management service 116. For instance, the user may provide the designated input by selecting a specified interface item on the user interface. In accordance with this embodiment, the registration agent 110 provides the encrypted data blob and the session ID to the intermediate cloud storage 112 in response to (e.g., based on) the user providing the designated input.

In activity 226, the intermediate cloud storage 112 provides a confirmation to the registration agent 110, confirming that the intermediate cloud storage has received the encrypted data blob and the session ID.

In activity 230, the registration system 114 authenticates to the intermediate cloud storage 112 using the session ID. In activity 230, the registration system 114 also provides the decryption key and a hash of the correlation key to the intermediate cloud storage 112. For instance, the registration system 114 may generate the hash of the correlation key by performing a hash operation on the correlation key in response to receipt of the correlation key from the registration agent 110 in activity 222.

In activity 232, the intermediate cloud storage 112 provides a confirmation to the registration system 114, confirming authentication of the registration system 114 and receipt of the decryption key and the hash of the correlation key from the registration system 114 in activity 230.

In activity 234, the intermediate cloud storage 112 authenticates to the registration agent 110 using the session ID, which was received by the intermediate cloud storage 112 from the registration system 114 in activity 230.

In activity 236, the registration agent 110 provides a confirmation to the intermediate cloud storage 112, confirming authentication of the intermediate cloud storage 112 in activity 234.

In activity 238, the registration system 114 provides a request to the intermediate cloud storage 112, requesting that the intermediate cloud storage decrypt the encrypted data blob using the decryption key. The request includes the session ID and the correlation key.

In activity 240, the intermediate cloud storage 112 compares the session ID that is received in activity 230 and the sessions ID that is received in activity 238 to determine whether the session IDs are same. In activity 240, the intermediate cloud storage 112 also compares the hash of the correlation key that is received in activity 230 and a hash of the key that is received in activity 238 to determine whether the hashes are same. For instance, the intermediate cloud storage 112 may perform a hash operation on the correlation key that is received in activity 238 to generate the hash thereof. If the session IDs are the same and the hashes are the same, the intermediate cloud storage 112 decrypts the encrypted data blob using the decryption key. If the session IDs are not the same and/or the hashes are not the same, the intermediate cloud storage 112 does not decrypt the encrypted data blob. For purposes of illustration, it is assumed that the session IDs are the same and the hashes are the same and that the intermediate cloud storage 112 decrypts the encrypted data blob.

In activity 242, the intermediate cloud storage 112 provides the decrypted data blob to the registration system 114.

In activity 244, the registration system 114 authenticates to the cloud-based management service 116 using the session ID. In activity 244, the registration system 114 also registers the user device with the cloud-based management service 116 using the decrypted data blob.

In activity 248, the cloud-based management service 116 forwards the decrypted data blob to the DDS 118.

In activity 250, the DDS 118 provides a deployment platform profile ID to the cloud-based management service 116. The deployment platform profile ID identifies configuration policies that are to be applied to the user device during configuration of the user device. In an example embodiment, the DDS 118 cross-references decrypted data blobs, which are associated with respective user devices, with respective deployment platform profile IDs, which are associated with the respective user devices, to provide respective hash-ID pairs. Each of the deployment platform profile IDs identifies configuration policies that are to be applied to the respective user device. In accordance with this embodiment, the DDS 118 traverses the hash-ID pairs to identity the hash-ID pair that includes the decrypted data blob that is received in activity 248. In further accordance with this embodiment, the DDS 118 identifies the deployment platform profile ID that is to be provided to the cloud-based management service based on the deployment platform profile ID being cross-referenced with the decrypted data blob in the identified hash-ID pair.

In activity 252, the cloud-based management service 116 provides the deployment platform profile ID that is received by the cloud-based management service in activity 250 to the registration agent 110 to enable configuration of the user device with using the configuration policies.

In activity 254, the registration agent 110 requests authorization from the user of the user device to configure the user device. For instance, the registration agent 110 may display an inquiry on a display of the user device, requesting the authorization. The inquiry may indicate that the user device has been registered with the cloud-based management service 116 and is therefore authorized to be configured using the configuration policies that are identified by the deployment platform profile ID.

Activity 254 may include asking the user which configurations and/or which of the policies that are identified by the deployment platform profile ID are to be applied to the user device. For instance, the registration agent 110 may present a list of the configurations and/or the policies and enable the user of the user device to select which of the configurations and/or policies are to be applied to the user device or deselect configurations and/or policies that are not to be applied to the user device. Accordingly, the user of the user device may make asynchronous changes to the configurations and/or policies that are to be applied to the user device.

In activity 256, the registration agent 110 configures the user device based on the configuration policies that are identified by the deployment platform profile ID. For instance, the deployment platform profile ID may include the configuration policies or a location indicator that indicates a location from which the configuration policies are capable of being retrieved. Activity 256 is performed in response to the user of the user device providing the authorization that is requested in activity 254. For instance, the user may provide the authorization by providing a designated input via a user interface (e.g., display, keyboard, or mouse) of the user device.

Activities 222, 224, 226, 228, 230, 232, 234, 236, 238, 240, 242, 244, 246, 248, 250, 252, 254, and 256 may be performed for each user device that is to be registered with the cloud-based management service 116. It will be recognized that any one or more of the activities may be performed in a batch manner (e.g., for more than one user device at a time) to increase speed and efficiency of the registration process. It will be further recognized that any one or more of the activities may be performed iteratively such that the activity is performed for the user devices in respective iterations. Any two or more of the iterations may be performed consecutively.

In some example embodiments, one or more of the steps shown in the activity diagram 200 may not be performed. Moreover, steps in addition to or in lieu of the steps shown in the activity diagram 200 may be performed.

Figure 3:
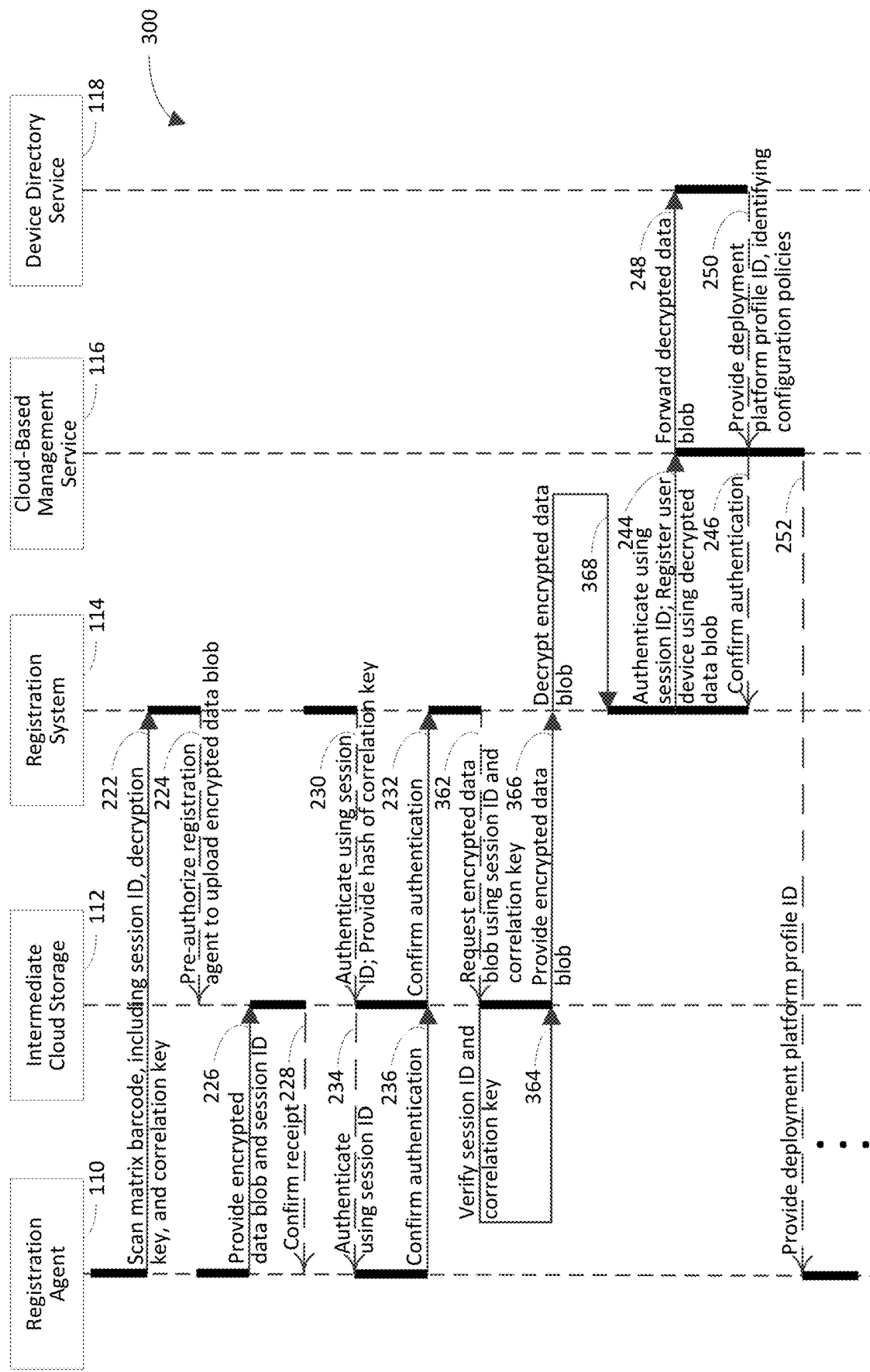

FIG. 3 is another example activity diagram 300 for registering a user device with a cloud-based management service using an intermediate cloud storage in accordance with an embodiment. FIG. 3 depicts the registration agent 110, the intermediate cloud storage 112, the registration system 114, the cloud-based management service 116, and the device directory service (DDS) 118 shown in FIG. 1. The activity diagram 300 includes activities 222, 224, 226, 228, 230, 232, 234, 236, 244, 246, 248, 250, and 252, which are the same as the activities having the same reference numerals shown in FIG. 2. The activity diagram 300 does not include activities 238, 240, and 242 of the activity diagram 200 shown in FIG. 2. Instead, the activity diagram 300 of FIG. 3 includes activities 362, 364, 366, and 368. Activities 362, 364, 366, and 368 will now be described with reference to the intermediate cloud storage 112 and the registration system 114.

In activity 362, the registration system 114 provides a request to the intermediate cloud storage 112, requesting the encrypted data blob. The request includes the session ID and the correlation key.

In activity 364, the intermediate cloud storage 112 compares the session ID that is received in activity 230 and the sessions ID that is received in activity 362 to determine whether the session IDs are same. In activity 364, the intermediate cloud storage 112 also compares the hash of the correlation key that is received in activity 230 and a hash of the correlation key that is received in activity 362 to determine whether the hashes are same. For instance, the intermediate cloud storage 112 may perform a hash operation on the correlation key that is received in activity 362 to generate the hash thereof. If the session IDs are the same and the hashes are the same, the intermediate cloud storage 112 provides the encrypted data blob. If the session IDs are not the same and/or the hashes are not the same, the intermediate cloud storage 112 does not provide the encrypted data blob. For purposes of illustration, it is assumed that the session IDs are the same and the hashes are the same and that the intermediate cloud storage 112 provides the encrypted data blob.

In activity 366, the intermediate cloud storage 112 provides the encrypted data blob to the registration system 114.

In activity 368, the registration system 114 decrypts the encrypted data blob using the decryption key to provide a decrypted data blob.

In some example embodiments, one or more of the steps shown in the activity diagram 300 may not be performed. Moreover, steps in addition to or in lieu of the steps shown in the activity diagram 300 may be performed. For instance, the activity diagram 300 may further include activities 254 and 256 shown in the activity diagram 200 of FIG. 2.

Figure 4:
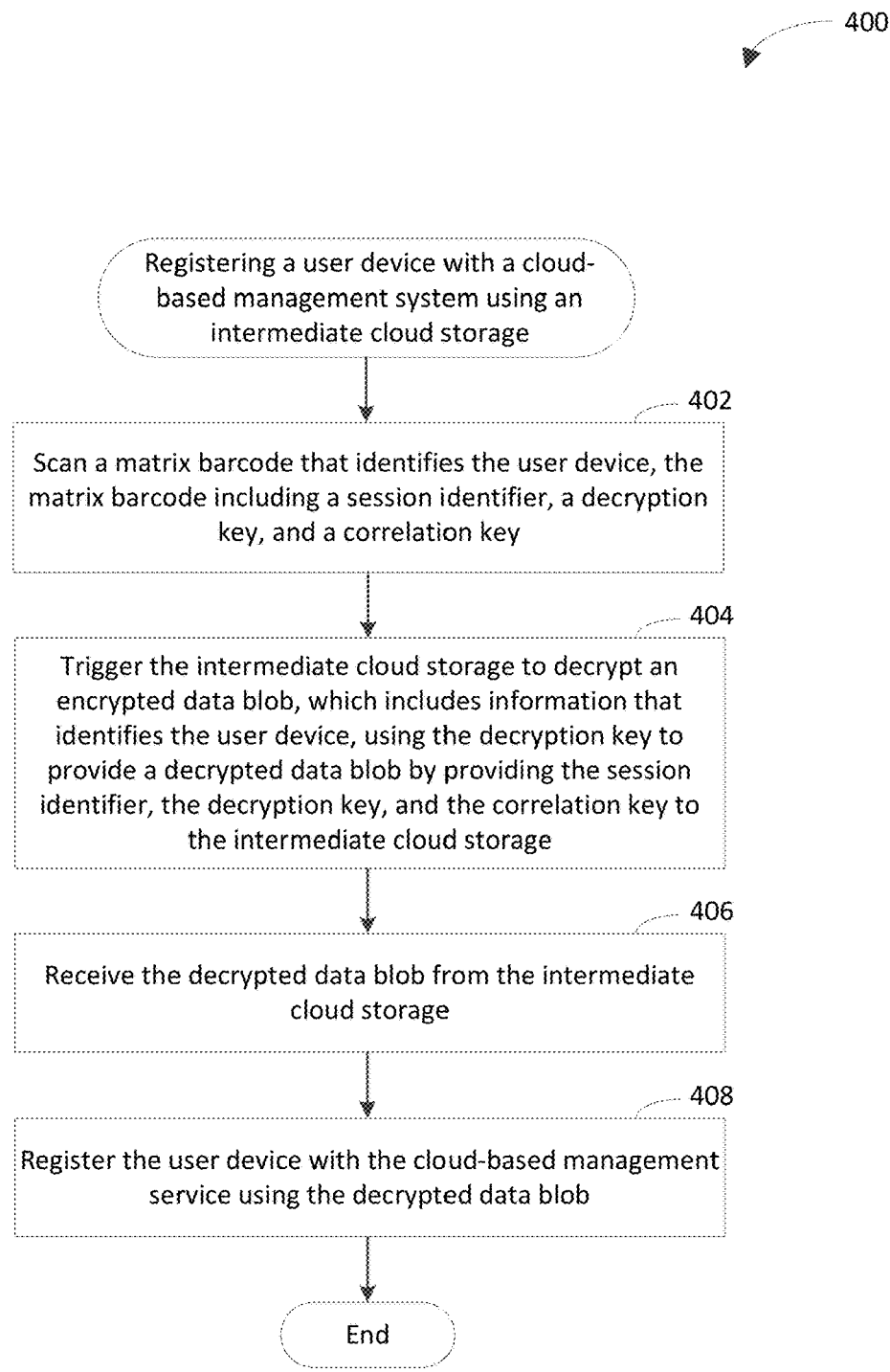
FIGS. 4-6 and 8-9 depict flowcharts of example methods for registering a user device with a cloud-based management service using an intermediate cloud storage in accordance with embodiments.
Figure 5:
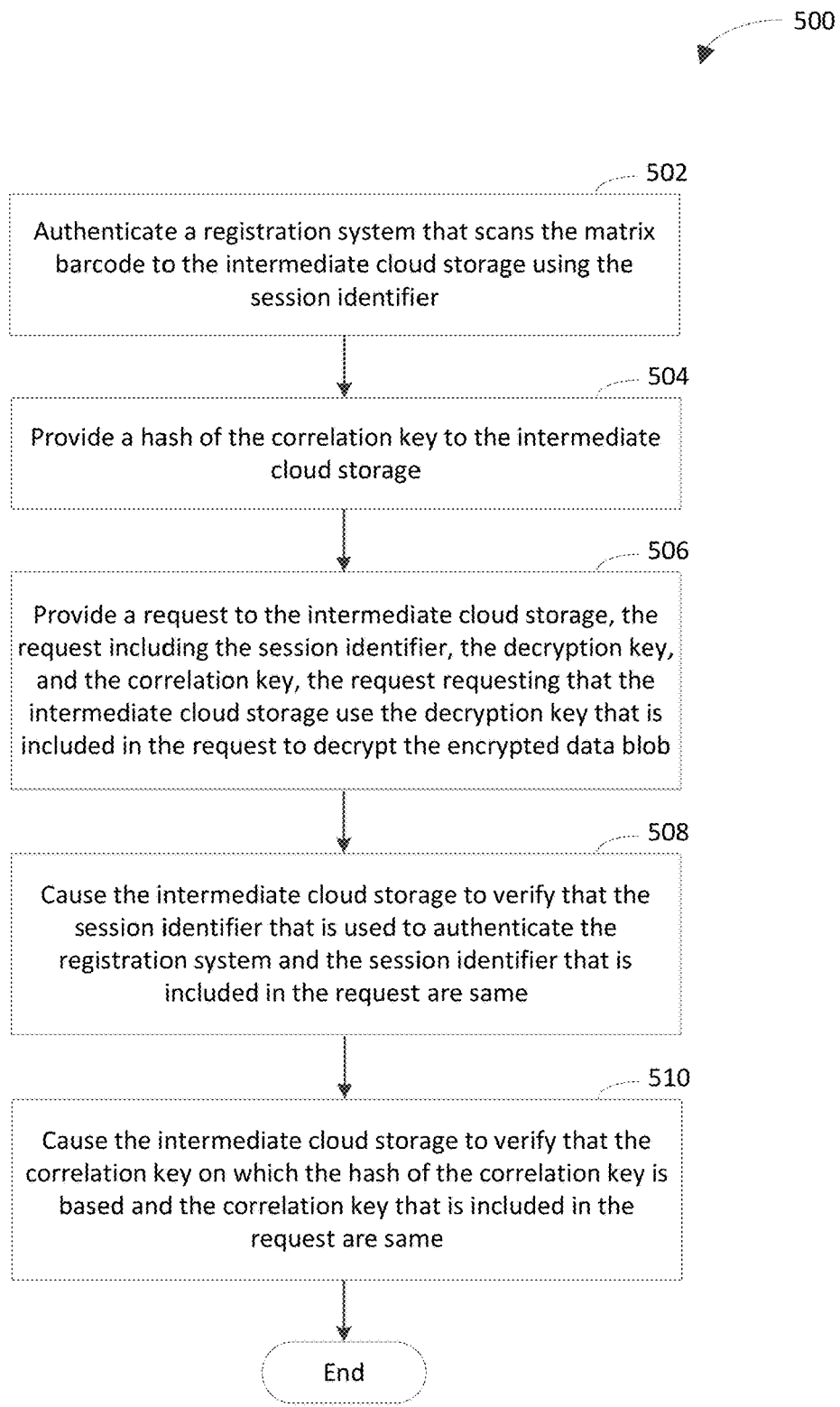
Figure 6:
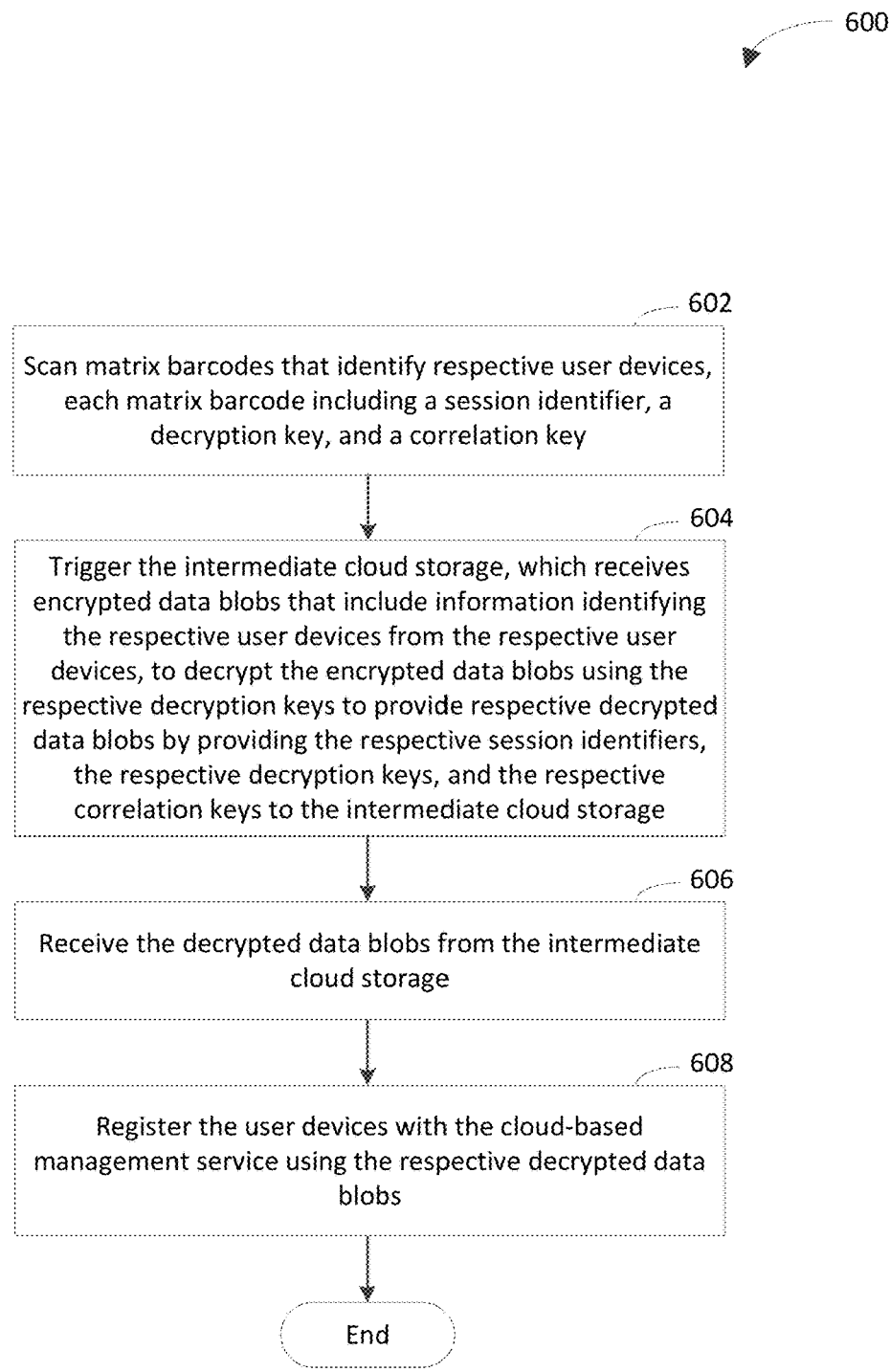
Figure 7:
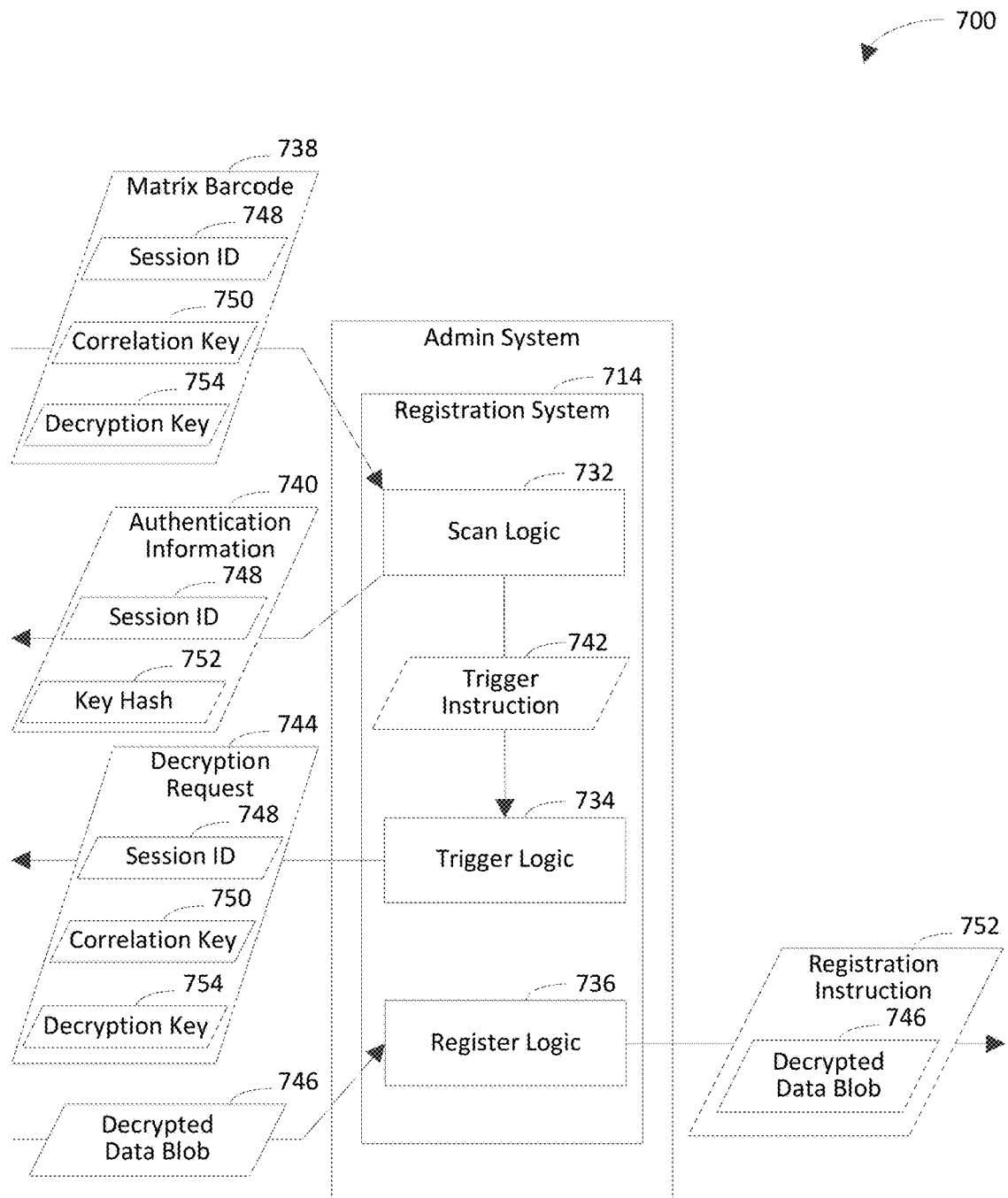
FIGS. 7 and 10 are block diagrams of example implementations of an admin system shown in FIG. 1 in accordance with embodiments.

FIGS. 4-6 depict flowcharts 400, 500, and 600 of example methods for registering a user device with a cloud-based management service using an intermediate cloud storage in accordance with embodiments. Flowcharts 400, 500, and 600 may be performed by registration system 114 shown in FIGS. 1-3, for example. For illustrative purposes, flowcharts 400, 500, and 600 are described with respect to an admin system 700 shown in FIG. 7. The admin system 700 includes a registration system 714, which is an example implementation of the registration system 114 shown in FIGS. 1-3. The registration system 714 includes scan logic 732, trigger logic 734, and register logic 736. Further structural and operational embodiments will be apparent to persons skilled in the relevant art(s) based on the discussion regarding flowcharts 400, 500, and 600.

As shown in FIG. 4, the method of flowchart 400 begins at step 402. In step 402, a matrix barcode that identifies the user device is scanned. The matrix barcode includes a session identifier, a decryption key, and a correlation key. For example, the matrix barcode may be a QR code. In another example, the matrix barcode may include a JavaScript Object Notation (JSON) blob that includes the session identifier and the correlation key. The session identifier identifies (e.g., uniquely identifies) a session during which the user device is registered with the cloud-based management service. The session identifier may be a global unique identifier (GUID). The decryption key is configured to be used to decrypt an encrypted data blob that is to be received from the user device. The correlation key is useable to correlate the user device to a record that is associated with the user device. In an example implementation, the scan logic 732 scans a matrix barcode 738 that identifies the user device. In accordance with this implementation, the matrix barcode 738 includes a session identifier (a.k.a. session ID) 748, a correlation key 750, and a decryption key 754. The scan logic 732 may generate a trigger instruction 742 based on (e.g., based at least in part on) receipt of the matrix barcode 738. The trigger instruction 742 instructs the trigger logic 734 to provide a decryption request 744 to the intermediate cloud storage.

At step 404, the intermediate cloud storage is triggered to decrypt the encrypted data blob using the decryption key to provide a decrypted data blob by providing the session identifier, the decryption key, and the correlation key to the intermediate cloud storage. The encrypted data blob includes information that identifies the user device. For instance, the information in the encrypted data blob may identify hardware that is included in the user device. The encrypted data blob may have been encrypted using an AES-256 encryption technique. Accordingly, the intermediate cloud storage may trigger the intermediate cloud storage to decrypt the encrypted data blob in accordance with the AES-256 encryption technique. It will be recognized that any suitable encryption technique may be used to decrypt the encrypted data blob, depending on the encryption technique that was used to generate the encrypted data blob. For instance, the decryption key may be an asymmetric public key or a symmetric key, depending on whether the encrypted data was encrypted using an asymmetric private key, which corresponds to the asymmetric public key, or the symmetric key. In an example implementation, the trigger logic 734 triggers the intermediate cloud storage to decrypt the encrypted data blob using the decryption key 754 to provide a decrypted data blob 746. For instance, the trigger logic 734 may trigger the intermediate cloud storage to decrypt the encrypted data blob based on receipt of the trigger instruction 742. In accordance with this implementation, the trigger logic 734 triggers the intermediate cloud storage by providing the decryption request 744, including the session identifier 748, the correlation key 750, and the decryption key 754, to the intermediate cloud storage. The decryption request 744 requests the intermediate cloud storage to decrypt the encrypted data blob.

In an example embodiment, triggering the intermediate cloud storage at step 404 includes enabling the intermediate cloud storage to locate the encrypted data blob using the session identifier by providing the session identifier to the intermediate cloud storage.

At step 406, the decrypted data blob is received from the intermediate cloud storage. In an example implementation, the register logic 736 receives the decrypted data blob 746 from the intermediate cloud storage in response to providing the decryption request 744 to the intermediate cloud storage.

At step 408, the user device is registered with the cloud-based management service using the decrypted data blob. In an example implementation, the register logic 736 registers the user device with the cloud-based management service using the decrypted data blob 746. For instance, the registration logic 736 may provide a registration instruction 752, which includes the decrypted data blob 746, to the cloud-based management service. For example, the registration instruction 752 may instruct the cloud-based management service to confirm registration of the user device with the cloud-based management service. In another example, the registration instruction 752 may instruct the cloud-based management service to request a deployment platform profile ID, which identifies configuration policies to be applied to the user device during configuration of the user device, from a device directory service.

In an example embodiment, registering the user device at step 408 includes initiating configuration of the user device with configuration policies by triggering provision of a deployment platform profile identifier to the user device. In accordance with this embodiment, the deployment platform profile identifier is based on the decrypted data blob and identifies the policies. For instance, the deployment platform profile identifier may include the policies or include a pointer to a location at which the policies are stored. The deployment platform profile identifier may further identify applications that are to be deployed on the user device. Initiating the configuration of the user device may include embedding information regarding the policies in a Unified Extensible Firmware Interface (UEFI) interface of a motherboard of the user device.

In another example embodiment, the intermediate cloud storage is authenticated to the user device using the session identifier.

In some example embodiments, one or more steps 402, 404, 406, and/or 408 of flowchart 400 may not be performed. Moreover, steps in addition to or in lieu of steps 402, 404, 406, and/or 408 may be performed. For instance, in an example embodiment, the method of flowchart 400 further includes signing a registration system, which scans the matrix barcode, into a tenant of the cloud-based management service. For example, the registration logic 736 may sign the registration system 714 into the tenant. In accordance with this embodiment, the decrypted data blob includes a serial number of the user device. In further accordance with this embodiment, registering the user device with the cloud-based management service includes calling an application programming interface (API) of the cloud-based management service and passing the correlation key and the serial number of the user device to the API.

In another example embodiment, the method of flowchart 400 further includes pre-authorizing the user device to upload the encrypted data blob to the intermediate cloud storage prior to the user device uploading the encrypted data blob to the intermediate cloud storage based at least in part on receipt of the matrix barcode from the user device. For instance, the scan logic 732 may pre-authorize the user device to upload the encrypted data blob to the intermediate cloud storage based at least in part on receipt of the matrix barcode 738 from the user device.

In yet another example embodiment, the method of flowchart 400 includes one or more of the steps shown in flowchart 500 of FIG. 5. As shown in FIG. 5, the method of flowchart 500 begins at step 502. In step 502, a registration system that scans the matrix barcode authenticates to the intermediate cloud storage using the session identifier. In an example implementation, the scan logic 732 authenticates the registration system 714, which scans the matrix barcode 738 to the intermediate cloud storage, using the session ID 748. For instance, the scan logic 732 may provide authentication information 740, including the session ID 748, to the intermediate cloud storage to authenticate the registration system 714 to the intermediate cloud storage.

At step 504, a hash of the correlation key is provided to the intermediate cloud storage. In an example implementation, the scan logic 732 provides a key hash 752, which is a hash of the correlation key 750, to the intermediate cloud storage. For instance, the key hash 752 may be included in the authentication information 740 that the scan logic 732 provides to the intermediate cloud storage. In accordance with this implementation, the scan logic 732 may generate the key hash 752 by performing a hash operation on the correlation key 750. For example, the scan logic 732 may generate the hash of the correlation key 750 using a Secure Hash Algorithm 2 (SHA-2) technique, such as SHA-256.

At step 506, a request is provided to the intermediate cloud storage. The request includes the session identifier, the decryption key, and the correlation key. The request requests that the intermediate cloud storage use the decryption key that is included in the request to decrypt the encrypted data blob. In an example implementation, the trigger logic 734 provides the decryption request 744 to the intermediate cloud storage. The decryption request 744 includes the session identifier 748, the correlation key 750, and the decryption key 754. The decryption request 744 requests that the intermediate cloud storage use the decryption key 754 that is included in the decryption request 744 to decrypt the encrypted data blob.

At step 508, the intermediate cloud storage is caused to verify that the session identifier that is used to authenticate the registration system and the session identifier that is included in the request are same. For instance, causing the intermediate cloud storage to verify that the session identifier that is used to authenticate the registration system and the session identifier that is included in the request are same at step 508 may be a result of providing the request to the intermediate cloud storage at step 506. In an example implementation, the trigger logic 734 causes the intermediate cloud storage to verify that the session ID that is used to authenticate the registration system 714 and the session ID 748 that is included in the decryption request 744 are same.

At step 510, the intermediate cloud storage is caused to verify that the correlation key on which the hash of the correlation key is based and the correlation key that is included in the request are same. For example, the intermediate cloud storage may be caused to verify that the hash of the correlation key that is provided to the intermediate cloud storage at step 504 and a hash of the correlation key that is included in the request that is provided to the intermediate cloud storage at step 506 are the same. Causing the intermediate cloud storage to verify that the correlation key on which the hash of the correlation key is based and the correlation key that is included in the request are same at step 510 may be a result of providing the request to the intermediate cloud storage at step 506. In an example implementation, the trigger logic 734 causes the intermediate cloud storage to verify that the correlation key on which the hash of the correlation key is based and the correlation key 750 that is included in the decryption request 744 are same.

In an aspect of this embodiment, decryption of the encrypted data blob is based on steps 508 and 510 being successfully completed.

In still another example embodiment, the method of flowchart 400 includes one or more of the steps shown in flowchart 600 of FIG. 6. As shown in FIG. 6, the method of flowchart 600 begins at step 602. In step 602, matrix barcodes that identify respective user devices are scanned. Each matrix barcode includes a session identifier, a decryption key, and a correlation key. Each session identifier identifies a session during which the respective user device is registered with the cloud-based management service. Each decryption key is configured to be used to decrypt an encrypted data blob that is to be received from the respective user device. Each correlation key is useable to correlate the respective user device to actions and/or records that are associated with the respective user device. In an example embodiment, the scan logic 732 scans the matrix barcodes.

At step 604, the intermediate cloud storage, which receives encrypted data blobs that include information identifying the respective user devices from the respective user devices, is triggered to decrypt the encrypted data blobs using the respective decryption keys to provide respective decrypted data blobs by providing the respective session identifiers, the respective decryption keys, and the respective correlation keys to the intermediate cloud storage. In an example implementation, trigger logic 734 triggers the intermediate cloud storage to decrypt the encrypted data blobs using the respective decryption keys to provide the respective decrypted data blobs.

At step 606, the decrypted data blobs are received from the intermediate cloud storage. In an example implementation, the register logic 736 receives the decrypted data blobs from the intermediate cloud storage.

At step 608, the user devices are registered with the cloud-based management service using the respective decrypted data blobs. In an example implementation, the register logic 736 registers the user devices with the cloud-based management service using the respective decrypted data blobs.

In an aspect of this embodiment, the method of flowchart 500 further includes signing a registration system, which scans the matrix barcodes, into a tenant of the cloud-based management service. For instance, the registration logic 736 may sign the registration system 714 into the tenant. In accordance with this aspect, the decrypted data blobs include respective serial numbers of the respective user devices. In further accordance with this aspect, registering the user devices with the cloud-based management service at step 608 includes performing a batch call into an application programming interface (API) of the cloud-based management service and passing the correlation keys and the serial numbers of the respective user devices to the API.

It will be recognized that the admin system 700 may not include one or more of the scan logic 732, the trigger logic 734, and/or the register logic 736. Furthermore, the admin system 700 may include components in addition to or in lieu of the scan logic 732, the trigger logic 734, and/or the register logic 736.

Figure 8:
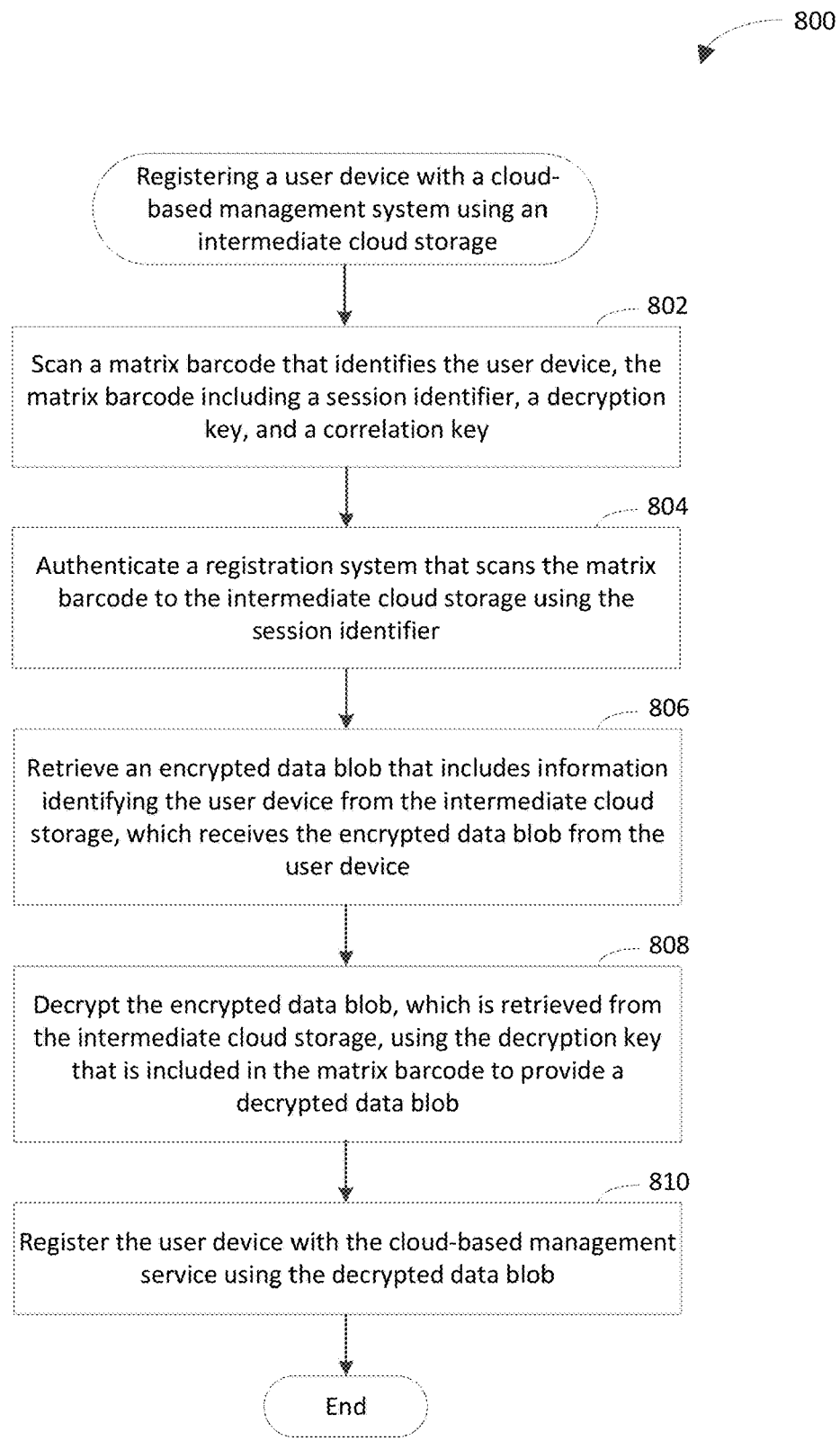
Figure 9:
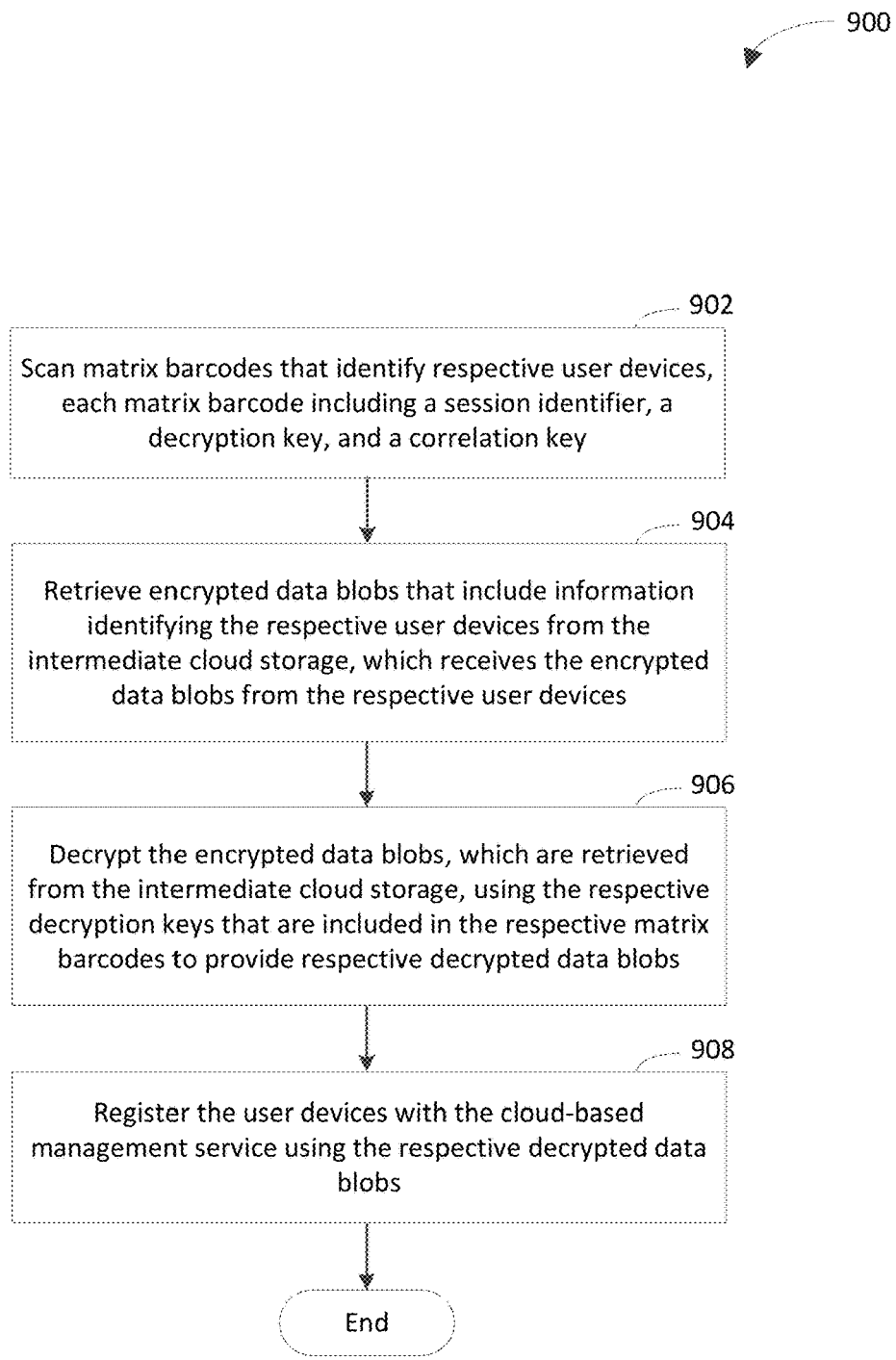

FIG. 8-9 depict flowcharts 800 and 900 of example methods for registering a user device with a cloud-based management service using an intermediate cloud storage in accordance with embodiments. Flowcharts 800 and 900 may be performed by registration system 114 shown in FIGS. 1-3, for example. For illustrative purposes, flowcharts 800 and 900 are described with respect to an admin system 1000 shown in FIG. 10. The admin system 1000 includes a registration system 1014, which is an example implementation of the registration system 114 shown in FIGS. 1-3. The registration system 1014 includes scan logic 732, decryption logic 1056, and register logic 736. Further structural and operational embodiments will be apparent to persons skilled in the relevant art(s) based on the discussion regarding flowcharts 800 and 900.

As shown in FIG. 8, the method of flowchart 800 begins at step 802. In step 802, a matrix barcode that identifies the user device is scanned. The matrix barcode includes a session identifier, a decryption key, and a correlation key. The session identifier identifies (e.g., uniquely identifies) a session during which the user device is registered with the cloud-based management service. The decryption key is configured to be used to decrypt an encrypted data blob that is to be received from the user device. The correlation key is useable to correlate the user device to actions and/or records that are associated with the user device. In an example implementation, the scan logic 1032 scans a matrix barcode 738 that identifies the user device. In accordance with this implementation, the matrix barcode 738 includes a session identifier (a.k.a. session ID) 748, a decryption key 754, and a correlation key 750.

At step 804, a registration system that scans the matrix barcode is authenticated to the intermediate cloud storage using the session identifier. In an example implementation, the scan logic 732 authenticates the registration system 1014 to the intermediate cloud storage using the session ID 748. For instance, the scan logic 732 may provide authentication information 740, including the session ID 748, to the intermediate cloud storage to authenticate the registration system 1014 to the intermediate cloud storage. The authentication information may further include a key hash 752, which is a hash of the correlation key 750. The scan logic 732 may authenticate the registration system 1014 to the intermediate cloud storage further using the key hash 752.

In an example embodiment, the intermediate cloud storage is authenticated to the user device using the session identifier.

At step 806, the encrypted data blob, which includes information identifying the user device, is retrieved from the intermediate cloud storage, which receives the encrypted data blob from the user device. In an example implementation, decryption logic 1056 retrieves an encrypted data blob 1066 that includes the information identifying the user device from the intermediate cloud storage, which receives the encrypted data blob 1066 from the user device. For instance, the decryption logic 1056 may receive the session ID 748 and the correlation key 750 from the scan logic 732. In accordance with this implementation, the decryption logic 1056 may generate a blob request 1064, which includes the session ID 748 and the correlation key 750. In further accordance with this implementation, the decryption logic 1056 may provide the blob request 1064 to the intermediate cloud storage. In further accordance with this implementation, the decryption logic 1056 may receive the encrypted data blob 1066 from the intermediate cloud storage in response to providing the blob request 1064 to the intermediate cloud storage. For instance, the decryption logic 1056 may receive the encrypted data blob 1066 from the intermediate cloud storage based on the intermediate cloud storage confirming that the session ID 748 in the authentication information 740 and the session ID 748 in the blob request 1064 are same and further based on the intermediate cloud storage confirming that the key hash 752 in the authentication information 740 and a hash of the correlation key 750 in the blob request 1064 are same.

In an example embodiment, retrieving the encrypted data blob at step 806 includes enabling the intermediate cloud storage to locate the encrypted data blob using the session identifier by providing the session identifier to the intermediate cloud storage.

At step 808, the encrypted data blob, which is retrieved from the intermediate cloud storage, is decrypted using the decryption key that is included in the matrix barcode to provide a decrypted data blob. In an example implementation, decryption logic 1056 decrypts the encrypted data blob 1066 using the decryption key 754 that is included in the matrix barcode 738 to provide a decrypted data blob 746. For instance, the decryption logic 1056 may receive the decryption key 754 from the scan logic 732.

At step 810, the user device is registered with the cloud-based management service using the decrypted data blob. In an example implementation, the register logic 736 registers the user device with the cloud-based management service using the decrypted data blob 746. For instance, the registration logic 736 may provide a registration instruction 752, which includes the decrypted data blob 746, to the cloud-based management service. For example, the registration instruction 752 may instruct the cloud-based management service to confirm registration of the user device with the cloud-based management service. In another example, the registration instruction 752 may instruct the cloud-based management service to request a deployment platform profile ID, which identifies configuration policies to be applied to the user device during configuration of the user device, from a device directory service.

In an example embodiment, registering the user device at step 810 includes initiating configuration of the user device with configuration policies by triggering provision of a deployment platform profile identifier to the user device. In accordance with this embodiment, the deployment platform profile identifier is based on the decrypted data blob and identifies the policies.

In some example embodiments, one or more steps 802, 804, 806, 808, and/or 810 of flowchart 800 may not be performed. Moreover, steps in addition to or in lieu of steps 802, 804, 806, 808, and/or 810 may be performed. For instance, in an example embodiment, the method of flowchart 800 further includes signing a registration system, which scans the matrix barcode, into a tenant of the cloud-based management service. For example, the registration logic 736 may sign the registration system 1014 into the tenant. In accordance with this embodiment, the decrypted data blob includes a serial number of the user device. In further accordance with this embodiment, registering the user device with the cloud-based management service includes calling an application programming interface (API) of the cloud-based management service and passing the correlation key and the serial number of the user device to the API.

In another example embodiment, the method of flowchart 800 further includes pre-authorizing the user device to upload the encrypted data blob to the intermediate cloud storage prior to the user device uploading the encrypted data blob to the intermediate cloud storage based at least in part on receipt of the matrix barcode from the user device. For instance, the scan logic 732 may pre-authorize the user device to upload the encrypted data blob to the intermediate cloud storage based at least in part on receipt of the matrix barcode 738 from the user device.

In yet another example embodiment, the method of flowchart 800 includes one or more of the steps shown in flowchart 900 of FIG. 9. As shown in FIG. 9, the method of flowchart 900 begins at step 902. In step 902, matrix barcodes that identify respective user devices are scanned. Each matrix barcode includes a session identifier, a decryption key, and a correlation key. Each session identifier identifies a session during which the respective user device is registered with the cloud-based management service. Each decryption key is configured to be used to decrypt an encrypted data blob that is to be received from the respective user device. Each correlation key is useable to correlate the respective user device to actions and/or records that are associated with the respective user device. In an example embodiment, the scan logic 732 scans the matrix barcodes.

At step 904, encrypted data blobs that include information identifying the respective user devices are retrieved from the intermediate cloud storage, which receives the encrypted data blobs from the respective user devices. In an example implementation, the decryption logic 1056 retrieves the encrypted data blobs that include the information identifying the respective user devices from the intermediate cloud storage.

At step 906, the encrypted data blobs, which are retrieved from the intermediate cloud storage, are decrypted using the respective decryption keys that are included in the respective matrix barcodes to provide respective decrypted data blobs. In an example implementation, the decryption logic 1056 decrypts the encrypted data blobs using the respective decryption keys.

At step 908, the user devices are registered with the cloud-based management service using the respective decrypted data blobs. In an example implementation, the register logic 736 registers the user devices with the cloud-based management service using the respective decrypted data blobs.

In an aspect of this embodiment, the method of flowchart 900 further includes signing a registration system, which scans the matrix barcodes, into a tenant of the cloud-based management service. For instance, the registration logic 736 may sign the registration system 1014 into the tenant. In accordance with this aspect, the decrypted data blobs include respective serial numbers of the respective user devices. In further accordance with this aspect, registering the user devices with the cloud-based management service at step 908 includes performing a batch call into an application programming interface (API) of the cloud-based management service and passing the correlation keys and the serial numbers of the respective user devices to the API.

Figure 10:
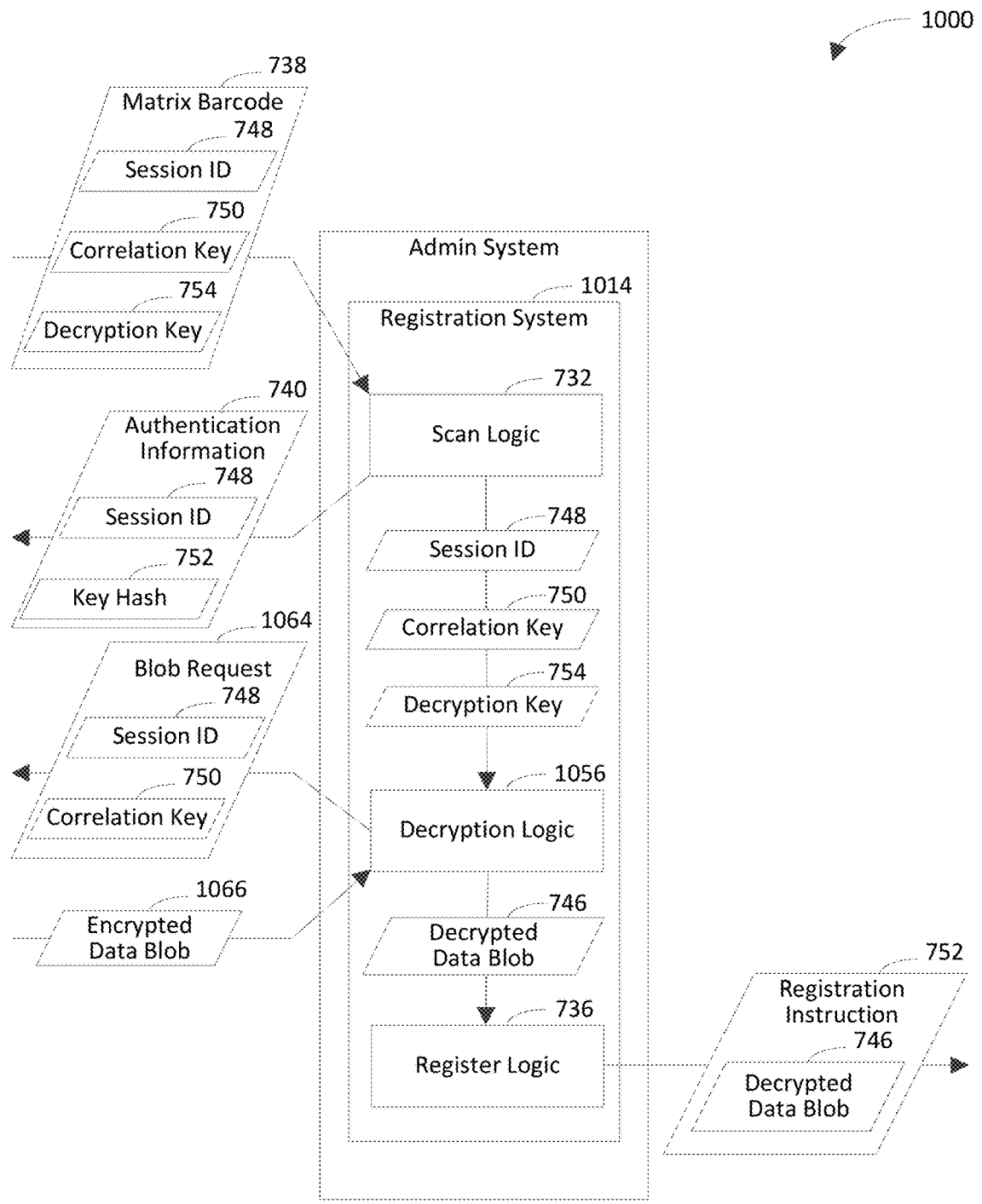

It will be recognized that the admin system 1000 of FIG. 10 may not include one or more of the scan logic 732, the decryption logic 1056, and/or the register logic 736. Furthermore, the admin system 1000 may include components in addition to or in lieu of the scan logic 732, the decryption logic 1056, and/or the register logic 736.

Figure 11:
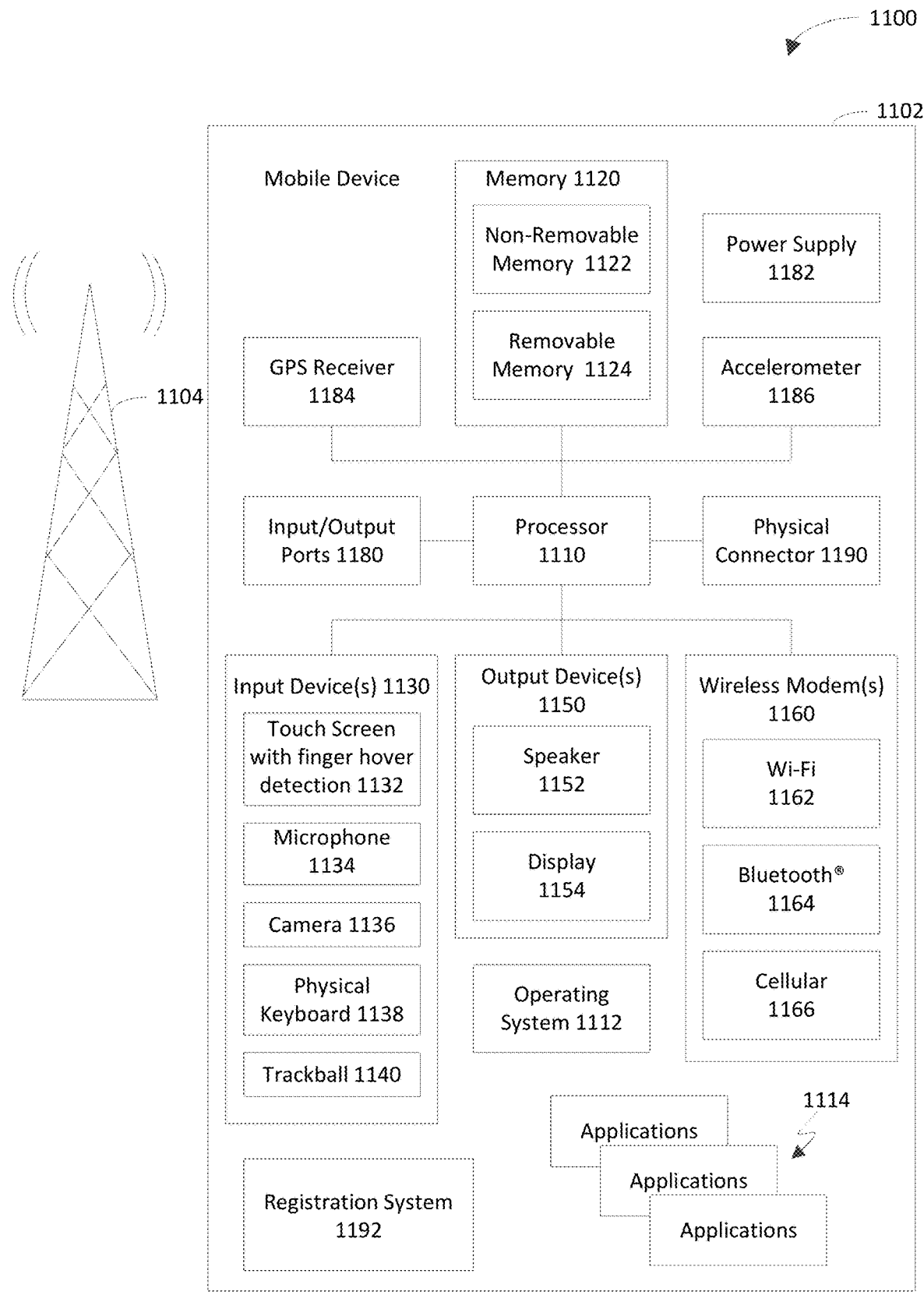
FIG. 11 is a system diagram of an exemplary mobile device in accordance with an embodiment.

FIG. 11 is a system diagram of an exemplary mobile device 1100 including a variety of optional hardware and software components, shown generally as 1102. Any components 1102 in the mobile device may communicate with any other component, though not all connections are shown, for ease of illustration. The mobile device 1100 may be any of a variety of computing devices (e.g., cell phone, smartphone, handheld computer, Personal Digital Assistant (PDA), etc.) and may allow wireless two-way communications with one or more mobile communications networks 1104, such as a cellular or satellite network, or with a local area or wide area network.

The mobile device 1100 may include a processor 1110 (e.g., signal processor, microprocessor, ASIC, or other control and processing logic circuitry) for performing such tasks as signal coding, data processing, input/output processing, power control, and/or other functions. An operating system 1112 may control the allocation and usage of the components 1102 and support for one or more applications 1114 (a.k.a. application programs). The applications 1114 may include common mobile computing applications (e.g., email applications, calendars, contact managers, web browsers, messaging applications) and any other computing applications (e.g., word processing applications, mapping applications, media player applications).

The mobile device 1100 may include memory 1120. The memory 1120 may include non-removable memory 1122 and/or removable memory 1124. The non-removable memory 1122 may include RAM, ROM, flash memory, a hard disk, or other well-known memory storage technologies. The removable memory 1124 may include flash memory or a Subscriber Identity Module (SIM) card, which is well known in GSM communication systems, or other well-known memory storage technologies, such as "smart cards." The memory 1120 may store data and/or code for running the operating system 1112 and the applications 1114. Example data may include web pages, text, images, sound files, video data, or other data sets to be sent to and/or received from one or more network servers or other devices via one or more wired or wireless networks. Memory 1120 may store a subscriber identifier, such as an International Mobile Subscriber Identity (IMSI), and an equipment identifier, such as an International Mobile Equipment Identifier (IMEI). Such identifiers may be transmitted to a network server to identify users and equipment.

The mobile device 1100 may support one or more input devices 1130, such as a touch screen 1132, microphone 1134, camera 1136, physical keyboard 1138 and/or trackball 1140 and one or more output devices 1150, such as a speaker 1152 and a display 1154. Touch screens, such as the touch screen 1132, may detect input in different ways. For example, capacitive touch screens detect touch input when an object (e.g., a fingertip) distorts or interrupts an electrical current running across the surface. As another example, touch screens may use optical sensors to detect touch input when beams from the optical sensors are interrupted. Physical contact with the surface of the screen is not necessary for input to be detected by some touch screens. For example, the touch screen 1132 may support a finger hover detection using capacitive sensing, as is well understood in the art. Other detection techniques may be used, including but not limited to camera-based detection and ultrasonic-based detection. To implement a finger hover, a user's finger is typically within a predetermined spaced distance above the touch screen, such as between 0.1 to 0.25 inches, or between 0.25 inches and 0.05 inches, or between 0.5 inches and 0.75 inches, or between 0.75 inches and 1 inch, or between 1 inch and 1.5 inches, etc.

The mobile device 1100 may include registration system 1192. The registration system 1192 is configured to register user device(s) with a cloud-based management system in accordance with any one or more of the techniques described herein.

Other possible output devices (not shown) may include piezoelectric or other haptic output devices. Some devices may serve more than one input/output function. For example, touch screen 1132 and display 1154 may be combined in a single input/output device. The input devices 1130 may include a Natural User Interface (NUI). An NUI is any interface technology that enables a user to interact with a device in a "natural" manner, free from artificial constraints imposed by input devices such as mice, keyboards, remote controls, and the like. Examples of NUI methods include those relying on speech recognition, touch and stylus recognition, gesture recognition both on screen and adjacent to the screen, air gestures, head and eye tracking, voice and speech, vision, touch, gestures, and machine intelligence. Other examples of a NUI include motion gesture detection using accelerometers/gyroscopes, facial recognition, 3D displays, head, eye, and gaze tracking, immersive augmented reality and virtual reality systems, all of which provide a more natural interface, as well as technologies for sensing brain activity using electric field sensing electrodes (EEG and related methods). Thus, in one specific example, the operating system 1112 or applications 1114 may include speech-recognition software as part of a voice control interface that allows a user to operate the mobile device 1100 via voice commands. Furthermore, the mobile device 1100 may include input devices and software that allows for user interaction via a user's spatial gestures, such as detecting and interpreting gestures to provide input to a gaming application.

Wireless modem(s) 1160 may be coupled to antenna(s) (not shown) and may support two-way communications between the processor 1110 and external devices, as is well understood in the art. The modem(s) 1160 are shown generically and may include a cellular modem 1166 for communicating with the mobile communication network 1104 and/or other radio-based modems (e.g., Bluetooth® 1164 and/or Wi-Fi 1162). At least one of the wireless modem(s) 1160 is typically configured for communication with one or more cellular networks, such as a GSM network for data and voice communications within a single cellular network, between cellular networks, or between the mobile device and a public switched telephone network (PSTN).

The mobile device may further include at least one input/output port 1180, a power supply 1182, a satellite navigation system receiver 1184, such as a Global Positioning System (GPS) receiver, an accelerometer 1186, and/or a physical connector 1190, which may be a USB port, IEEE 1394 (FireWire) port, and/or RS-232 port. The illustrated components 1102 are not required or all-inclusive, as any components may be deleted and other components may be added as would be recognized by one skilled in the art.

Although the operations of some of the disclosed methods are described in a particular, sequential order for convenient presentation, it should be understood that this manner of description encompasses rearrangement, unless a particular ordering is required by specific language set forth herein. For example, operations described sequentially may in some cases be rearranged or performed concurrently. Moreover, for the sake of simplicity, the attached figures may not show the various ways in which the disclosed methods may be used in conjunction with other methods.

Any one or more of the registration agents 110A-110M, the intermediate cloud storage 112, the registration system 114, the cloud-based management service 116, the DDS 118, the registration system 714, the scan logic 732, the trigger logic 734, the register logic 736, the registration system 1014, the decryption logic 1056, the activity diagram 200, the activity diagram 300, the flowchart 400, the flowchart 500, the flowchart 600, the flowchart 800, and/or the flowchart 900 may be implemented in hardware, software, firmware, or any combination thereof.

For example, any one or more of the registration agents 110A-110M, the intermediate cloud storage 112, the registration system 114, the cloud-based management service 116, the DDS 118, the registration system 714, the scan logic 732, the trigger logic 734, the register logic 736, the registration system 1014, the decryption logic 1056, the activity diagram 200, the activity diagram 300, the flowchart 400, the flowchart 500, the flowchart 600, the flowchart 800, and/or the flowchart 900 may be implemented, at least in part, as computer program code configured to be executed in one or more processors.

In another example, any one or more of the registration agents 110A-110M, the intermediate cloud storage 112, the registration system 114, the cloud-based management service 116, the DDS 118, the registration system 714, the scan logic 732, the trigger logic 734, the register logic 736, the registration system 1014, the decryption logic 1056, the activity diagram 200, the activity diagram 300, the flowchart 400, the flowchart 500, the flowchart 600, the flowchart 800, and/or the flowchart 900 may be implemented, at least in part, as hardware logic/electrical circuitry. Such hardware logic/electrical circuitry may include one or more hardware logic components. Examples of a hardware logic component include but are not limited to a field-programmable gate array (FPGA), an application-specific integrated circuit (ASIC), an application-specific standard product (ASSP), a system-on-a-chip system (SoC), a complex programmable logic device (CPLD), etc. For instance, a SoC may include an integrated circuit chip that includes one or more of a processor (e.g., a microcontroller, microprocessor, digital signal processor (DSP), etc.), memory, one or more communication interfaces, and/or further circuits and/or embedded firmware to perform its functions.

III. Further Discussion of Some Example Embodiments

A first example system to register a user device with a cloud-based management system using an intermediate cloud storage comprises a memory and one or more processors coupled to the memory. The one or more processors are configured to analyze a matrix barcode that identifies the user device, the matrix barcode including a session identifier, a decryption key, and a correlation key. The session identifier identifies a session during which the user device is registered with the cloud-based management service. The decryption key is configured to be used to decrypt an encrypted data blob that is to be received from the user device. The correlation key is useable to correlate the user device to a record that is associated with the user device. The one or more processors are further configured to trigger the intermediate cloud storage to decrypt the encrypted data blob, which includes information that identifies the user device, using the decryption key to provide a decrypted data blob by providing the session identifier, the decryption key, and the correlation key to the intermediate cloud storage. The one or more processors are further configured to register the user device with the cloud-based management service using the decrypted data blob, which is received from the intermediate cloud storage.

In a first aspect of the first example system, the one or more processors are configured to authenticate the first example system to the intermediate cloud storage using the session identifier. In accordance with the first aspect, the one or more processors are configured to provide a hash of the correlation key to the intermediate cloud storage. In further accordance with the first aspect, the one or more processors are configured to provide a request to the intermediate cloud storage. The request includes the session identifier, the decryption key, and the correlation key. The request requests that the intermediate cloud storage use the decryption key that is included in the request to decrypt the encrypted data blob. In further accordance with the first aspect, the one or more processors are configured to cause the intermediate cloud storage to verify that the session identifier that is used to authenticate the first example system to the intermediate cloud storage and the session identifier that is included in the request are same. In further accordance with the first aspect, the one or more processors are configured to cause the intermediate cloud storage to verify that the correlation key on which the hash of the correlation key is based and the correlation key that is included in the request are same.

In a second aspect of the first example system, the intermediate cloud storage is authenticated to the user device using the session identifier. The second aspect of the first example system may be implemented in combination with the first aspect of the first example system, though the example embodiments are not limited in this respect.

In a third aspect of the first example system, the one or more processors are configured to analyze a plurality of matrix barcodes that identify a plurality of respective user devices. Each matrix barcode includes a session identifier, a decryption key, and a correlation key. Each session identifier identifies a session during which the respective user device is registered with the cloud-based management service. Each decryption key is configured to be used to decrypt an encrypted data blob that is to be received from the respective user device. Each correlation key is useable to correlate the respective user device to a record that is associated with the respective user device. In accordance with the third aspect, the one or more processors are configured to trigger the intermediate cloud storage, which receives a plurality of encrypted data blobs that include information identifying the plurality of respective user devices from the plurality of respective user devices, to decrypt the plurality of encrypted data blobs using the respective decryption keys to provide a plurality of respective decrypted data blobs by providing the respective session identifiers, the respective decryption keys, and the respective correlation keys to the intermediate cloud storage. In further accordance with the third aspect, the one or more processors are configured to register the plurality of user devices with the cloud-based management service using the plurality of respective decrypted data blobs, which are received from the intermediate cloud storage. The third aspect of the first example system may be implemented in combination with the first and/or second aspect of the first example system, though the example embodiments are not limited in this respect.

In an implementation of the third aspect of the first example system, the one or more processors are configured to sign the first example system into a tenant of the cloud-based management service. In accordance with this implementation, the one or more processors are configured to perform a batch call into an application programming interface (API) of the cloud-based management service. In further accordance with this implementation, the one or more processors are configured to pass the correlation keys and a plurality of serial numbers of the plurality of respective user devices to the API, wherein the plurality of serial numbers is included in the plurality of respective decrypted data blobs.

In a fourth aspect of the first example system, the one or more processors are configured to enable the intermediate cloud storage to locate the encrypted data blob using the session identifier by providing the session identifier to the intermediate cloud storage. The fourth aspect of the first example system may be implemented in combination with the first, second, and/or third aspect of the first example system, though the example embodiments are not limited in this respect.

In a fifth aspect of the first example system, the one or more processors are configured to initiate configuration of the user device with configuration policies by triggering provision of a deployment platform profile identifier, which is based on the decrypted data blob and which identifies the policies, to the user device. The fifth aspect of the first example system may be implemented in combination with the first, second, third, and/or fourth aspect of the first example system, though the example embodiments are not limited in this respect.

In a sixth aspect of the first example system, the one or more processors are configured to sign the first example system into a tenant of the cloud-based management service.

In accordance with the sixth aspect, the one or more processors are configured to call an application programming interface (API) of the cloud-based management service. In further accordance with the sixth aspect, the one or more processors are configured to pass the correlation key and a serial number of the user device to the API, wherein the serial number of the user device is included in the decrypted data blob. The sixth aspect of the first example system may be implemented in combination with the first, second, third, fourth, and/or fifth aspect of the first example system, though the example embodiments are not limited in this respect.

In a seventh aspect of the first example system, the one or more processors are further configured to pre-authorize the user device to upload the encrypted data blob to the intermediate cloud storage prior to the user device uploading the encrypted data blob to the intermediate cloud storage based at least in part on receipt of the matrix barcode from the user device. The seventh aspect of the first example system may be implemented in combination with the first, second, third, fourth, fifth, and/or sixth aspect of the first example system, though the example embodiments are not limited in this respect.

A second example system to register a user device with a cloud-based management system using an intermediate cloud storage comprises a memory and one or more processors coupled to the memory. The one or more processors are configured to analyze a matrix barcode that identifies the user device. The matrix barcode includes a session identifier, a decryption key, and a correlation key. The session identifier identifies a session during which the user device is registered with the cloud-based management service. The decryption key is configured to be used to decrypt an encrypted data blob that is to be received from the user device. The correlation key is useable to correlate the user device to a record that is associated with the user device. The one or more processors are further configured to retrieve the encrypted data blob, which includes information identifying the user device, from the intermediate cloud storage, which receives the encrypted data blob from the user device. The one or more processors are further configured to decrypt the encrypted data blob, which is retrieved from the intermediate cloud storage, using the decryption key that is included in the matrix barcode to provide a decrypted data blob. The one or more processors are further configured to register the user device with the cloud-based management service using the decrypted data blob.

In a first aspect of the second example system, the one or more processors are further configured to authenticate the second example system to the intermediate cloud storage using the session identifier.

In a second aspect of the second example system, the intermediate cloud storage is authenticated to the user device using the session identifier. The second aspect of the second example system may be implemented in combination with the first aspect of the second example system, though the example embodiments are not limited in this respect.

In a third aspect of the second example system, the one or more processors are configured to analyze a plurality of matrix barcodes that identify a plurality of respective user devices. Each matrix barcode includes a session identifier, a decryption key, and a correlation key. Each session identifier identifies a session during which the respective user device is registered with the cloud-based management service. Each decryption key is configured to be used to decrypt an encrypted data blob that is to be received from the respective user device. Each correlation key is useable to correlate the respective user device to a record that is associated with the respective user device. In accordance with the third aspect, the one or more processors are configured to retrieve a plurality of encrypted data blobs that include information identifying the plurality of respective user devices from the intermediate cloud storage, which receives the plurality of encrypted data blobs from the plurality of respective user devices. In further accordance with the third aspect, the one or more processors are configured to decrypt the plurality of encrypted data blobs, which are retrieved from the intermediate cloud storage, using the respective decryption keys that are included in the plurality of respective matrix barcodes to provide a plurality of respective decrypted data blobs. In further accordance with the third aspect, the one or more processors are configured to register the plurality of user devices with the cloud-based management service using the plurality of respective decrypted data blobs. The third aspect of the second example system may be implemented in combination with the first and/or second aspect of the second example system, though the example embodiments are not limited in this respect.

In an implementation of the third aspect of the second example system, the one or more processors are configured to sign the second example system into a tenant of the cloud-based management service. In accordance with this implementation, the one or more processors are configured to perform a batch call into an application programming interface (API) of the cloud-based management service. In further accordance with this implementation, the one or more processors are configured to pass the correlation keys and a plurality of serial numbers of the plurality of respective user devices to the API, wherein the plurality of decrypted data blobs includes the plurality of respective serial numbers.

In a fourth aspect of the second example system, the one or more processors are configured to enable the intermediate cloud storage to locate the encrypted data blob using the session identifier by providing the session identifier to the intermediate cloud storage. The fourth aspect of the second example system may be implemented in combination with the first, second, and/or third aspect of the second example system, though the example embodiments are not limited in this respect.

In a fifth aspect of the second example system, the one or more processors are configured to initiate configuration of the user device with configuration policies by triggering provision of a deployment platform profile identifier, which is based on the decrypted data blob and which identifies the policies, to the user device. The fifth aspect of the second example system may be implemented in combination with the first, second, third, and/or fourth aspect of the second example system, though the example embodiments are not limited in this respect.

In a sixth aspect of the second example system, the one or more processors are configured to sign the second example system into a tenant of the cloud-based management service. In accordance with the sixth aspect, the one or more processors are configured to call an application programming interface (API) of the cloud-based management service. In further accordance with the sixth aspect, the one or more processors are configured to pass the correlation key and a serial number of the user device to the API, wherein the serial number of the user device is included in the decrypted data blob. The sixth aspect of the second example system may be implemented in combination with the first, second, third, fourth, and/or fifth aspect of the second example system, though the example embodiments are not limited in this respect.

In a seventh aspect of the second example system, the one or more processors are further configured to pre-authorize the user device to upload the encrypted data blob to the intermediate cloud storage prior to the user device uploading the encrypted data blob to the intermediate cloud storage based at least in part on receipt of the matrix barcode from the user device. The seventh aspect of the second example system may be implemented in combination with the first, second, third, fourth, fifth, and/or sixth aspect of the second example system, though the example embodiments are not limited in this respect.

In a first example method of registering a user device with a cloud-based management system using an intermediate cloud storage, a matrix barcode that identifies the user device is scanned. The matrix barcode includes a session identifier, a decryption key, and a correlation key. The session identifier identifies a session during which the user device is registered with the cloud-based management service. The decryption key is configured to be used to decrypt an encrypted data blob that is to be received from the user device. The correlation key is useable to correlate the user device to a record that is associated with the user device. The intermediate cloud storage is triggered to decrypt the encrypted data blob, which includes information that identifies the user device, using the decryption key to provide a decrypted data blob by providing the session identifier, the decryption key, and the correlation key to the intermediate cloud storage. The decrypted data blob is received from the intermediate cloud storage. The user device is registered with the cloud-based management service using the decrypted data blob.

In a first aspect of the first example method, a registration system that scans the matrix barcode is authenticated to the intermediate cloud storage using the session identifier. In accordance with the first aspect, a hash of the correlation key is provided to the intermediate cloud storage. In further accordance with the first aspect, triggering the intermediate cloud storage to decrypt the encrypted data blob comprises providing a request to the intermediate cloud storage. The request includes the session identifier, the decryption key, and the correlation key. The request requests that the intermediate cloud storage use the decryption key that is included in the request to decrypt the encrypted data blob. In further accordance with the first aspect, triggering the intermediate cloud storage to decrypt the encrypted data blob comprises causing the intermediate cloud storage to verify that the session identifier that is used to authenticate the registration system that scans the matrix barcode to the intermediate cloud storage and the session identifier that is included in the request are same. In further accordance with the first aspect, triggering the intermediate cloud storage to decrypt the encrypted data blob comprises causing the intermediate cloud storage to verify that the correlation key on which the hash of the correlation key is based and the correlation key that is included in the request are same.

In a second aspect of the first example method, the intermediate cloud storage is authenticated to the user device using the session identifier. The second aspect of the first example method may be implemented in combination with the first aspect of the first example method, though the example embodiments are not limited in this respect.

In a third aspect of the first example method, scanning the matrix barcode comprises scanning a plurality of matrix barcodes that identify a plurality of respective user devices. Each matrix barcode includes a session identifier, a decryption key, and a correlation key. Each session identifier identifies a session during which the respective user device is registered with the cloud-based management service. Each decryption key is configured to be used to decrypt an encrypted data blob that is to be received from the respective user device. Each correlation key is useable to correlate the respective user device to a record that is associated with the respective user device. In accordance with the third aspect, triggering the intermediate cloud storage comprises triggering the intermediate cloud storage, which receives a plurality of encrypted data blobs that include information identifying the plurality of respective user devices from the plurality of respective user devices, to decrypt the plurality of encrypted data blobs using the respective decryption keys to provide a plurality of respective decrypted data blobs by providing the respective session identifiers, the respective decryption keys, and the respective correlation keys to the intermediate cloud storage. In further accordance with the third aspect, receiving the decrypted data blob comprises receiving the plurality of decrypted data blobs from the intermediate cloud storage. In further accordance with the third aspect, registering the user device comprises registering the plurality of user devices with the cloud-based management service using the plurality of respective decrypted data blobs. The third aspect of the first example method may be implemented in combination with the first and/or second aspect of the first example method, though the example embodiments are not limited in this respect.

In an implementation of the first aspect of the first example method, the first example method further comprises signing a registration system, which scans the plurality of matrix barcodes, into a tenant of the cloud-based management service. In accordance with this implementation, the plurality of decrypted data blobs includes a plurality of respective serial numbers of the plurality of respective user devices. In further accordance with this implementation, registering the plurality of user devices with the cloud-based management service comprises performing a batch call into an application programming interface (API) of the cloud-based management service. In further accordance with this implementation, registering the plurality of user devices with the cloud-based management service comprises passing the correlation keys and the serial numbers of the respective user devices to the API.

In a fourth aspect of the first example method, triggering the intermediate cloud storage to decrypt the encrypted data blob comprises enabling the intermediate cloud storage to locate the encrypted data blob using the session identifier by providing the session identifier to the intermediate cloud storage. The fourth aspect of the first example method may be implemented in combination with the first, second, and/or third aspect of the first example method, though the example embodiments are not limited in this respect.

In a fifth aspect of the first example method, registering the user device comprises initiating configuration of the user device with configuration policies by triggering provision of a deployment platform profile identifier, which is based on the decrypted data blob and which identifies the policies, to the user device. The fifth aspect of the first example method may be implemented in combination with the first, second, third, and/or fourth aspect of the first example method, though the example embodiments are not limited in this respect.

In a sixth aspect of the first example method, the first example method further comprises signing a registration system, which scans the matrix barcode, into a tenant of the cloud-based management service. In accordance with the sixth aspect, the decrypted data blob includes a serial number of the user device. In further accordance with the sixth aspect, registering the user device with the cloud-based management service comprises calling an application programming interface (API) of the cloud-based management service. In further accordance with the sixth aspect, registering the user device with the cloud-based management service comprises passing the correlation key and the serial number of the user device to the API. The sixth aspect of the first example method may be implemented in combination with the first, second, third, fourth, and/or fifth aspect of the first example method, though the example embodiments are not limited in this respect.

In a seventh aspect of the first example method, the first example method further comprises pre-authorizing the user device to upload the encrypted data blob to the intermediate cloud storage prior to the user device uploading the encrypted data blob to the intermediate cloud storage based at least in part on receipt of the matrix barcode from the user device. The seventh aspect of the first example method may be implemented in combination with the first, second, third, fourth, fifth, and/or sixth aspect of the first example method, though the example embodiments are not limited in this respect.

In a second example method of registering a user device with a cloud-based management system using an intermediate cloud storage, a matrix barcode that identifies the user device is scanned. The matrix barcode includes a session identifier, a decryption key, and a correlation key. The session identifier identifies a session during which the user device is registered with the cloud-based management service. The decryption key is configured to be used to decrypt an encrypted data blob that is to be received from the user device. The correlation key is useable to correlate the user device to a record that is associated with the user device. The encrypted data blob, which includes information identifying the user device, is retrieved from the intermediate cloud storage, which receives the encrypted data blob from the user device. The encrypted data blob, which is retrieved from the intermediate cloud storage, is decrypted using the decryption key that is included in the matrix barcode to provide a decrypted data blob. The user device is registered with the cloud-based management service using the decrypted data blob.

In a first aspect of the second example method, the second example method further comprises authenticating a registration system that scans the matrix barcode to the intermediate cloud storage using the session identifier.

In a second aspect of the second example method, the intermediate cloud storage is authenticated to the user device using the session identifier. The second aspect of the second example method may be implemented in combination with the first aspect of the second example method, though the example embodiments are not limited in this respect.

In a third aspect of the second example method, scanning the matrix barcode comprises scanning a plurality of matrix barcodes that identify a plurality of respective user devices. Each matrix barcode includes a session identifier, a decryption key, and a correlation key. Each session identifier identifies a session during which the respective user device is registered with the cloud-based management service. Each decryption key is configured to be used to decrypt an encrypted data blob that is to be received from the respective user device. Each correlation key is useable to correlate the respective user device to a record that is associated with the respective user device. In accordance with the third aspect, retrieving the encrypted data blob comprises retrieving a plurality of encrypted data blobs that include information identifying the plurality of respective user devices from the intermediate cloud storage, which receives the plurality of encrypted data blobs from the plurality of respective user devices. In further accordance with the third aspect, decrypting the encrypted data blob comprises decrypting the plurality of encrypted data blobs, which are retrieved from the intermediate cloud storage, using the respective decryption keys that are included in the plurality of respective matrix barcodes to provide a plurality of respective decrypted data blobs. In further accordance with the third aspect, registering the user device comprises registering the plurality of user devices with the cloud-based management service using the plurality of respective decrypted data blobs. The third aspect of the second example method may be implemented in combination with the first and/or second aspect of the second example method, though the example embodiments are not limited in this respect.

In an implementation of the first aspect of the second example method, the second example method further comprises signing a registration system, which scans the plurality of matrix barcodes, into a tenant of the cloud-based management service. In accordance with this implementation, the plurality of decrypted data blobs includes a plurality of respective serial numbers of the plurality of respective user devices. In further accordance with this implementation, registering the plurality of user devices with the cloud-based management service comprises performing a batch call into an application programming interface (API) of the cloud-based management service. In further accordance with this implementation, registering the plurality of user devices with the cloud-based management service comprises passing the correlation keys and the serial numbers of the respective user devices to the API.

In a fourth aspect of the second example method, retrieving the encrypted data blob from the intermediate cloud storage comprises enabling the intermediate cloud storage to locate the encrypted data blob using the session identifier by providing the session identifier to the intermediate cloud storage. The fourth aspect of the second example method may be implemented in combination with the first, second, and/or third aspect of the second example method, though the example embodiments are not limited in this respect.

In a fifth aspect of the second example method, registering the user device comprises initiating configuration of the user device with configuration policies by triggering provision of a deployment platform profile identifier, which is based on the decrypted data blob and which identifies the policies, to the user device. The fifth aspect of the second example method may be implemented in combination with the first, second, third, and/or fourth aspect of the second example method, though the example embodiments are not limited in this respect.

In a sixth aspect of the second example method, the second example method further comprises signing a registration system, which scans the matrix barcode, into a tenant of the cloud-based management service. In accordance with the sixth aspect, the decrypted data blob includes a serial number of the user device. In further accordance with the sixth aspect, registering the user device with the cloud-based management service comprises calling an application programming interface (API) of the cloud-based management service. In further accordance with the sixth aspect, registering the user device with the cloud-based management service comprises passing the correlation key and the serial number of the user device to the API. The sixth aspect of the second example method may be implemented in combination with the first, second, third, fourth, and/or fifth aspect of the second example method, though the example embodiments are not limited in this respect.

In a seventh aspect of the second example method, the second example method further comprises pre-authorizing the user device to upload the encrypted data blob to the intermediate cloud storage prior to the user device uploading the encrypted data blob to the intermediate cloud storage based at least in part on receipt of the matrix barcode from the user device. The seventh aspect of the second example method may be implemented in combination with the first, second, third, fourth, fifth, and/or sixth aspect of the second example method, though the example embodiments are not limited in this respect.

A first example computer program product comprises a computer-readable storage medium having instructions recorded thereon for enabling a processor-based system to register a user device with a cloud-based management system using an intermediate cloud storage by perform operations. The operations comprise analyzing a matrix barcode that identifies the user device. The matrix barcode includes a session identifier, a decryption key, and a correlation key. The session identifier identifies a session during which the user device is registered with the cloud-based management service. The decryption key is configured to be used to decrypt an encrypted data blob that is to be received from the user device. The correlation key is useable to correlate the user device to a record that is associated with the user device. The operations further comprise triggering the intermediate cloud storage to decrypt the encrypted data blob, which includes information that identifies the user device, using the decryption key to provide a decrypted data blob by providing the session identifier, the decryption key, and the correlation key to the intermediate cloud storage. The operations further comprise registering the user device with the cloud-based management service using the decrypted data blob, which is received from the intermediate cloud storage.

A second example computer program product comprises a computer-readable storage medium having instructions recorded thereon for enabling a processor-based system to register a user device with a cloud-based management system using an intermediate cloud storage by perform operations. The operations comprise analyzing a matrix barcode that identifies the user device. The matrix barcode includes a session identifier, a decryption key, and a correlation key. The session identifier identifies a session during which the user device is registered with the cloud-based management service. The decryption key is configured to be used to decrypt an encrypted data blob that is to be received from the user device. The correlation key is useable to correlate the user device to a record that is associated with the user device. The operations further comprise retrieving the encrypted data blob, which includes information identifying the user device, from the intermediate cloud storage, which receives the encrypted data blob from the user device. The operations further comprise decrypting the encrypted data blob, which is retrieved from the intermediate cloud storage, using the decryption key that is included in the matrix barcode to provide a decrypted data blob. The operations further comprise registering the user device with the cloud-based management service using the decrypted data blob.

IV. Example Computer System

Figure 12:
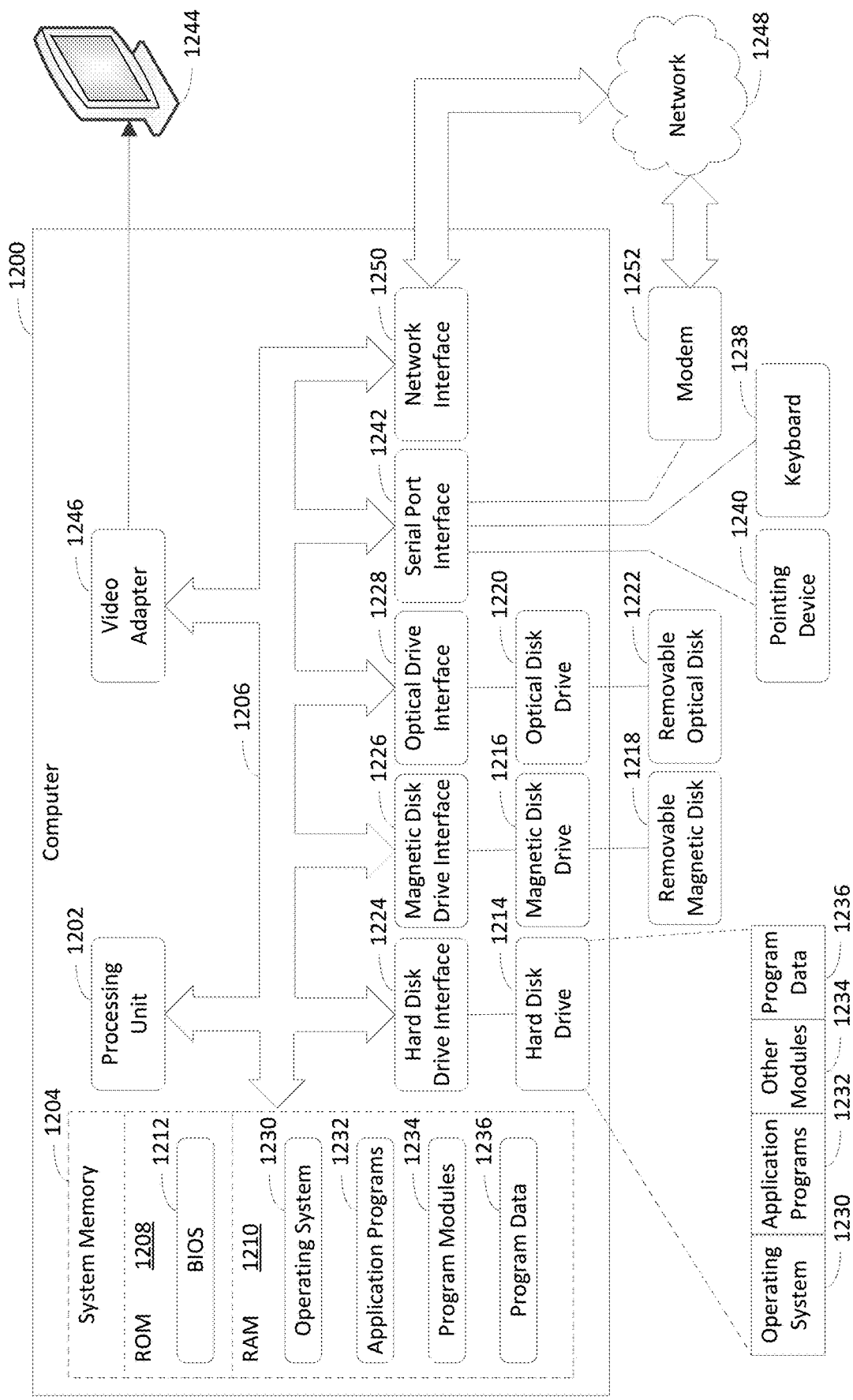
FIG. 12 depicts an example computer in which embodiments may be implemented.

FIG. 12 depicts an example computer 1200 in which embodiments may be implemented. Any one or more of user devices 102A-102M, any one or more of servers 106A-106N, and/or admin system 108 shown in FIG. 1; admin system 700 shown in FIG. 7; and/or admin system 1000 shown in FIG. 10 may be implemented using computer 1200, including one or more features of computer 1200 and/or alternative features. Computer 1200 may be a general-purpose computing device in the form of a conventional personal computer, a mobile computer, or a workstation, for example, or computer 1200 may be a special purpose computing device. The description of computer 1200 provided herein is provided for purposes of illustration, and is not intended to be limiting. Embodiments may be implemented in further types of computer systems, as would be known to persons skilled in the relevant art(s).

As shown in FIG. 12, computer 1200 includes a processing unit 1202, a system memory 1204, and a bus 1206 that couples various system components including system memory 1204 to processing unit 1202. Bus 1206 represents one or more of any of several types of bus structures, including a memory bus or memory controller, a peripheral bus, an accelerated graphics port, and a processor or local bus using any of a variety of bus architectures. System memory 1204 includes read only memory (ROM) 1208 and random access memory (RAM) 1210. A basic input/output system 1212 (BIOS) is stored in ROM 1208.

Computer 1200 also has one or more of the following drives: a hard disk drive 1214 for reading from and writing to a hard disk, a magnetic disk drive 1216 for reading from or writing to a removable magnetic disk 1218, and an optical disk drive 1220 for reading from or writing to a removable optical disk 1222 such as a CD ROM, DVD ROM, or other optical media. Hard disk drive 1214, magnetic disk drive 1216, and optical disk drive 1220 are connected to bus 1206 by a hard disk drive interface 1224, a magnetic disk drive interface 1226, and an optical drive interface 1228, respectively. The drives and their associated computer-readable storage media provide nonvolatile storage of computer-readable instructions, data structures, program modules and other data for the computer. Although a hard disk, a removable magnetic disk and a removable optical disk are described, other types of computer-readable storage media can be used to store data, such as flash memory cards, digital video disks, random access memories (RAMs), read only memories (ROM), and the like.

A number of program modules may be stored on the hard disk, magnetic disk, optical disk, ROM, or RAM. These programs include an operating system 1230, one or more application programs 1232, other program modules 1234, and program data 1236. Application programs 1232 or program modules 1234 may include, for example, computer program logic for implementing any one or more of (e.g., at least a portion of) the registration agents 110A-110M, the intermediate cloud storage 112, the registration system 114, the cloud-based management service 116, the DDS 118, the registration system 714, the scan logic 732, the trigger logic 734, the register logic 736, the registration system 1014, the decryption logic 1056, the activity diagram 200 (including any activity of activity diagram 200), the activity diagram 300 (including any activity of activity diagram 300), the flowchart 400 (including any step of flowchart 400), the flowchart 500 (including any step of flowchart 500), the flowchart 600 (including any step of flowchart 600), the flowchart 800 (including any step of flowchart 800), and/or the flowchart 900 (including any step of flowchart 900), as described herein.

A user may enter commands and information into the computer 1200 through input devices such as keyboard 1238 and pointing device 1240. Other input devices (not shown) may include a microphone, joystick, game pad, satellite dish, scanner, touch screen, camera, accelerometer, gyroscope, or the like. These and other input devices are often connected to the processing unit 1202 through a serial port interface 1242 that is coupled to bus 1206, but may be connected by other interfaces, such as a parallel port, game port, or a universal serial bus (USB).

A display device 1244 (e.g., a monitor) is also connected to bus 1206 via an interface, such as a video adapter 1246. In addition to display device 1244, computer 1200 may include other peripheral output devices (not shown) such as speakers and printers.

Computer 1200 is connected to a network 1248 (e.g., the Internet) through a network interface or adapter 1250, a modem 1252, or other means for establishing communications over the network. Modem 1252, which may be internal or external, is connected to bus 1206 via serial port interface 1242.

As used herein, the terms "computer program medium" and "computer-readable storage medium" are used to generally refer to media (e.g., non-transitory media) such as the hard disk associated with hard disk drive 1214, removable magnetic disk 1218, removable optical disk 1222, as well as other media such as flash memory cards, digital video disks, random access memories (RAMs), read only memories (ROM), and the like. A computer-readable storage medium is not a signal, such as a carrier signal or a propagating signal. For instance, a computer-readable storage medium may not include a signal. Accordingly, a computer-readable storage medium does not constitute a signal per se. Computer-readable storage media are distinguished from and non-overlapping with communication media (do not include communication media). Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media. Example embodiments are also directed to such communication media.

As noted above, computer programs and modules (including application programs 1232 and other program modules 1234) may be stored on the hard disk, magnetic disk, optical disk, ROM, or RAM. Such computer programs may also be received via network interface 1250 or serial port interface 1242. Such computer programs, when executed or loaded by an application, enable computer 1200 to implement features of embodiments discussed herein. Accordingly, such computer programs represent controllers of the computer 1200.

Example embodiments are also directed to computer program products comprising software (e.g., computer-readable instructions) stored on any computer-useable medium. Such software, when executed in one or more data processing devices, causes data processing device(s) to operate as described herein. Embodiments may employ any computer-useable or computer-readable medium, known now or in the future. Examples of computer-readable mediums include, but are not limited to storage devices such as RAM, hard drives, floppy disks, CD ROMs, DVD ROMs, zip disks, tapes, magnetic storage devices, optical storage devices, MEMS-based storage devices, nanotechnology-based storage devices, and the like.

It will be recognized that the disclosed technologies are not limited to any particular computer or type of hardware. Certain details of suitable computers and hardware are well known and need not be set forth in detail in this disclosure.

V. CONCLUSION

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims, and other equivalent features and acts are intended to be within the scope of the claims.

What is claimed is:

1. A system to register a user device with a cloud-based management system using an intermediate cloud storage, the system comprising:
 memory; and
 one or more processors coupled to the memory, the one or more processors configured to:
  analyze a matrix barcode that identifies the user device, the matrix barcode including a session identifier, a decryption key, and a correlation key,
   the session identifier identifying a session during which the user device is registered with the cloud-based management service,
   the decryption key configured to decrypt an encrypted data blob from the user device,
   the correlation key configured to correlate the user device to a record that is associated with the user device;
  trigger the intermediate cloud storage to decrypt the encrypted data blob, which includes information that identifies the user device, using the decryption key to provide a decrypted data blob by providing the session identifier, the decryption key, and the correlation key to the intermediate cloud storage; and
  register the user device with the cloud-based management service using the decrypted data blob, which is received from the intermediate cloud storage.

2. The system of claim 1, wherein the one or more processors are configured to:
 pre-authorize the user device to upload the encrypted data blob to the intermediate cloud storage prior to the user device uploading the encrypted data blob to the intermediate cloud storage based at least in part on receipt of the matrix barcode from the user device.

3. The system of claim 1, wherein the one or more processors are configured to:
 authenticate the system to the intermediate cloud storage using the session identifier;
 provide a hash of the correlation key to the intermediate cloud storage;
 provide a request to the intermediate cloud storage,
  the request including the session identifier, the decryption key, and the correlation key,
  the request requesting that the intermediate cloud storage use the decryption key that is included in the request to decrypt the encrypted data blob;
 cause the intermediate cloud storage to verify that the session identifier that is used to authenticate the system to the intermediate cloud storage and the session identifier that is included in the request are same; and cause the intermediate cloud storage to verify that the correlation key on which the hash of the correlation key is based and the correlation key that is included in the request are same.

4. The system of claim 1, wherein the intermediate cloud storage is authenticated to the user device using the session identifier.

5. The system of claim 1, wherein the one or more processors are configured to:
analyze a plurality of matrix barcodes that identify a plurality of respective user devices,
each matrix barcode including a session identifier, a decryption key, and a correlation key,
each session identifier identifying a session during which the respective user device is registered with the cloud-based management service,
each decryption key configured be used to decrypt an encrypted data blob that from the respective user device,
each correlation key configured to correlate the respective user device to a record that is associated with the respective user device;
trigger the intermediate cloud storage, which receives a plurality of encrypted data blobs that include information identifying the plurality of respective user devices from the plurality of respective user devices, to decrypt the plurality of encrypted data blobs using the respective decryption keys to provide a plurality of respective decrypted data blobs by providing the respective session identifiers, the respective decryption keys, and the respective correlation keys to the intermediate cloud storage; and
register the plurality of user devices with the cloud-based management service using the plurality of respective decrypted data blobs, which are received from the intermediate cloud storage.

6. The system of claim 5, wherein the one or more processors are configured to:
sign the system into a tenant of the cloud-based management service;
perform a batch call into an application programming interface (API) of the cloud-based management service; and
pass the correlation keys and a plurality of serial numbers of the plurality of respective user devices to the API, wherein the plurality of serial numbers is included in the plurality of respective decrypted data blobs.

7. The system of claim 1, wherein the one or more processors are configured to:
enable the intermediate cloud storage to locate the encrypted data blob using the session identifier by providing the session identifier to the intermediate cloud storage.

8. The system of claim 1, wherein the one or more processors are configured to:
initiate configuration of the user device with configuration policies by triggering provision of a deployment platform profile identifier, which is based on the decrypted data blob and which identifies the policies, to the user device.

9. The system of claim 1, wherein the one or more processors are configured to:
sign the system into a tenant of the cloud-based management service;
call an application programming interface (API) of the cloud-based management service; and
pass the correlation key and a serial number of the user device to the API, wherein the serial number of the user device is included in the decrypted data blob.

10. A method of registering a user device with a cloud-based management system using an intermediate cloud storage, the method comprising:
scanning a matrix barcode that identifies the user device, the matrix barcode including a session identifier, a decryption key, and a correlation key,
the session identifier identifying a session during which the user device is registered with the cloud-based management service,
the decryption key configured to decrypt an encrypted data blob from the user device,
the correlation key configured to correlate the user device to a record that is associated with the user device;
retrieving the encrypted data blob, which includes information identifying the user device, from the intermediate cloud storage, which receives the encrypted data blob from the user device;
decrypting the encrypted data blob, which is retrieved from the intermediate cloud storage, using the decryption key that is included in the matrix barcode to provide a decrypted data blob; and
registering the user device with the cloud-based management service using the decrypted data blob.

11. The method of claim 10, further comprising:
pre-authorizing the user device to upload the encrypted data blob to the intermediate cloud storage prior to the user device uploading the encrypted data blob to the intermediate cloud storage based at least in part on receipt of the matrix barcode from the user device.

12. The method of claim 10, further comprising:
authenticating a registration system that scans the matrix barcode to the intermediate cloud storage using the session identifier.

13. The method of claim 10, wherein the intermediate cloud storage is authenticated to the user device using the session identifier.

14. The method of claim 10, wherein scanning the matrix barcode comprises:
scanning a plurality of matrix barcodes that identify a plurality of respective user devices,
each matrix barcode including a session identifier, a decryption key, and a correlation key,
each session identifier identifying a session during which the respective user device is registered with the cloud-based management service,
each decryption key configured to decrypt an encrypted data blob from the respective user device,
each correlation key configured to correlate the respective user device to a record that is associated with the respective user device;
wherein retrieving the encrypted data blob comprises:
retrieving a plurality of encrypted data blobs that include information identifying the plurality of respective user devices from the intermediate cloud storage, which receives the plurality of encrypted data blobs from the plurality of respective user devices;
wherein decrypting the encrypted data blob comprises:
decrypting the plurality of encrypted data blobs, which are retrieved from the intermediate cloud storage, using the respective decryption keys that are included in the plurality of respective matrix barcodes to provide a plurality of respective decrypted data blobs; and wherein registering the user device comprises:
registering the plurality of user devices with the cloud-based management service using the plurality of respective decrypted data blobs.

15. The method of claim 14, further comprising:
signing a registration system, which scans the plurality of matrix barcodes, into a tenant of the cloud-based management service;

wherein the plurality of decrypted data blobs includes a plurality of respective serial numbers of the plurality of respective user devices; and wherein registering the plurality of user devices with the cloud-based management service comprises:
performing a batch call into an application programming interface (API) of the cloud-based management service; and
passing the correlation keys and the serial numbers of the respective user devices to the API.

16. The method of claim 10, wherein retrieving the encrypted data blob from the intermediate cloud storage comprises:
enabling the intermediate cloud storage to locate the encrypted data blob using the session identifier by providing the session identifier to the intermediate cloud storage.

17. The method of claim 10, wherein registering the user device comprises:
initiating configuration of the user device with configuration policies by triggering provision of a deployment platform profile identifier, which is based on the decrypted data blob and which identifies the policies, to the user device.

18. The method of claim 10, further comprising:
signing a registration system, which scans the matrix barcode, into a tenant of the cloud-based management service;

wherein the decrypted data blob includes a serial number of the user device; and wherein registering the user device with the cloud-based management service comprises:
calling an application programming interface (API) of the cloud-based management service; and
passing the correlation key and the serial number of the user device to the API.

19. A computer program product comprising a computer-readable storage medium having instructions recorded thereon for enabling a processor-based system to register a user device with a cloud-based management system using an intermediate cloud storage by perform operations, the operations comprising:
analyzing a matrix barcode that identifies the user device, the matrix barcode including a session identifier, a decryption key, and a correlation key,
the session identifier identifying a session during which the user device is registered with the cloud-based management service,
the decryption key configured to decrypt an encrypted data blob from the user device,
the correlation key configured to correlate the user device to a record that is associated with the user device;

triggering the intermediate cloud storage to decrypt the encrypted data blob, which includes information that identifies the user device, using the decryption key to provide a decrypted data blob by providing the session identifier, the decryption key, and the correlation key to the intermediate cloud storage; and registering the user device with the cloud-based management service using the decrypted data blob, which is received from the intermediate cloud storage.

20. The computer program product of claim 19, wherein the operations comprise:
authenticating a registration system that scans the matrix barcode to the intermediate cloud storage using the session identifier;
providing a hash of the correlation key to the intermediate cloud storage;
providing a request to the intermediate cloud storage,
the request including the session identifier, the decryption key, and the correlation key,
the request requesting that the intermediate cloud storage use the decryption key that is included in the request to decrypt the encrypted data blob;
causing the intermediate cloud storage to verify that the session identifier that is used to authenticate the registration system that scans the matrix barcode to the intermediate cloud storage and the session identifier that is included in the request are same; and
causing the intermediate cloud storage to verify that the correlation key on which the hash of the correlation key is based and the correlation key that is included in the request are same.

* * * * *